United States Patent [19]

Osawa

[11] Patent Number: 5,812,766
[45] Date of Patent: Sep. 22, 1998

[54] PROTOCOL CONVERSION SYSTEM

[75] Inventor: Tomoki Osawa, Tokyo, Japan

[73] Assignee: NEC Corporation, Tokyo, Japan

[21] Appl. No.: 495,804

[22] Filed: Jun. 27, 1995

[30] Foreign Application Priority Data

Jun. 29, 1994 [JP] Japan .................................. 6-147235

[51] Int. Cl.[6] .............................. G06F 12/10; G06F 13/00
[52] U.S. Cl. ....................... 395/200.6; 370/466; 370/913; 395/200.66
[58] Field of Search ........................... 395/200.2, 200.18, 395/200.17, 200.8, 200.76, 200.66, 200.6, 200.69, 200.61, 285; 370/466, 910, 913

[56] References Cited

U.S. PATENT DOCUMENTS

| | | | |
|---|---|---|---|
| 5,164,942 | 11/1992 | Kamerman et al. | 370/334 |
| 5,329,531 | 7/1994 | Diepstraten et al. | 370/94.2 |
| 5,369,639 | 11/1994 | Kamerman et al. | 370/85.3 |
| 5,519,834 | 5/1996 | Kamerman et al. | 395/200.06 |

OTHER PUBLICATIONS

"IEEE Standards for Local Area Networks: Carrier Sense Multiple Access With Collision Detection (CSMA/CD) Access Method and Physical Layer Specifications", ANSI/IEEE Std 802.3–1985, pp. 138–143.

*Primary Examiner*—Mehmet B. Geckil
*Attorney, Agent, or Firm*—Ostrolenk, Faber, Gerb & Soffen

[57] ABSTRACT

A protocol conversion system for use with a circuit for realizing a protocol in a CSMA/CD system for converting the protocol in the CSMA/CD system into a protocol in a CSMA/CA system. The protocol conversion system includes first counter for performing counting for a first period from a timing of termination of a carrier sense signal indicative of input of a reception signal of a data, a random number generator for generating a random number, a second counter for performing counting for a period corresponding to a value of the random number generated by the random number generator after termination of counting by the first counter, a reset circuit for forcedly stopping the first and second counters at a timing of beginning of the carrier sense signal, and dummy signal generator for generating a pseudo receive data while the second counter is active for counting.

15 Claims, 24 Drawing Sheets

FIG. 17

| STATE | EVENT | ACTION | NEXT STATE |
|---|---|---|---|
| 101 Defer XX Wait | 121 Carrier Off | - Start IFG 2/3 Timer | 111 IFG 2/3 Delay XX Wait |
| 111 IFG 2/3 Delay XX Wait | 122 IFG 2/3 Timeout | - Start Backoff Timer<br>- Active DCRS | 112 Backoff XX Wait |
|  | 123 Carrier On | - Reset IFG 2/3 Timer | 101 Defer XX Wait |
| 112 Backoff XX Wait | 124 Backoff Timeout | - Inactive DCRS | 102 Delay XX Wait |
|  | 125 Carrier On | - Reset Backoff Timer | 101 Defer XX Wait |
| 102 Delay XX Wait | 126 Carrier On | - No Action | 101 Defer XX Wait |

FIG. 18

| STATE | EVENT | ACTION | NEXT STATE |
|---|---|---|---|
| 311 Start | 321 Initialize | - Perform Initialization | 312 Idle |
| 312 Idle | 322 Data Request | - Construct Frame<br>- Start Frame Transmission | 313 Transmit |
|  | 325 Carrier On | - No Action | 314 Defer No Wait |
| 313 Transmit | 323 Transmit Done | (- Start Delay Timer)<br>(- Reset Attempt Count)<br>- Indicate Successful Transmision | 315 Delay No Wait |
| 314 Defer No Wait | 330 Data Request | - Construct Frame | 316 Defer Wait |
|  | 328 Carrier Off | - Start Delay Timer | 315 Delay No Wait |
| 315 Delay No Wait | 331 Data Request | - Construct Frame | 317 Delay Wait |
|  | 324 Delay Timeout | - No Action | 312 Idle |
|  | 327 Dummy CRS | - Reset Delay Timer<br>- Start Backoff Timer | 319 Backoff Wait |
|  | 326 Carrier On 2/3 | - Reset Delay Timer | 314 Defer No Wait |
| 316 Defer Wait | 336 Carrier Off | - Start Delay Timer | 317 Delay Wait |
| 317 Delay Wait | 339 Delay Timeout | - Start Frame Transmission | 313 Transmit |
|  | 335 Dummy CRS | - Reset Delay Timer<br>- Start Backoff Timer | 319 Backoff Wait |
|  | 334 Carrier On 2/3 | - Reset Delay Timer | 316 Defer Wait |
| 318 Backoff No Wait | 333 Data Request | - Construct Frame<br>- Reset DCRS | 319 Backoff Wait |
|  | 332 Carrier On | - Reset Backoff Timer<br>- Reset DCRS | 314 Defer No Wait |
|  | 329 Backoff Timeout | - Start Delay Timer | 315 Delay No Wait |
| 319 Backoff Wait | 338 Carrier On | - Reset DCRS<br>- Reset Backoff Timer | 316 Defer Wait |
|  | 337 Backoff Timeout | - Reset DCRS<br>- Start Delay Timer | 317 Delay Wait |

FIG. 19

| STATE | EVENT | ACTION | NEXT STATE |
|---|---|---|---|
| 501 Defer XX Wait | 521 Carrier Off | - Start IFG 2/3 Timer | 511 IFG 2/3 Delay XX Wait |
| 511 IFG 2/3 Delay XX Wait | 523 IFG 2/3 Timeout | - Start Backoff Timer<br>- Active DCRS | 512 Backoff XX Wait |
|  | 522 Carrier On | - Reset IFG 2/3 Timer | 501 Defer XX Wait |
| 512 Backoff XX Wait | 524 Backoff Timeout | - Inactive DCRS | 501 Defer XX Wait |
|  | 525 Carrier On | - Inactive DCRS | 513 Backoff Defer XX Wait |
| 513 Backoff Defer XX Wait | 527 Backoff Timeout | - Start Backoff Timer | 513 Backoff Defer XX Wait |
|  | 526 Carrier Off | - No Action | 514 Backoff IFG 2/3 Delay Defer XX Wait |
| 514 Backoff IFG 2/3 Delay Defer XX Wait | 529 IFG 2/3 Timeout | - Start IFG 2/3 Timer<br>- Active DCRS | 512 Backoff XX Wait |
|  | 528 Backoff Timeout | - Start Backoff Timer or Inactive DCRS | 514 Backoff IFG 2/3 Delay Defer XX Wait |

FIG. 20

| STATE | EVENT | ACTION | NEXT STATE |
|---|---|---|---|
| 601 Start | 621 Initialize | - Perform Initialization | 602 Idle |
| 602 Idle | 622 Data Request | - Construct Frame<br>- Start Frame Transmission | 603 Transmit |
| | 624 Carrier On | - No Action | 604 Defer No Wait |
| 603 Transmit | 626 Transmit Done | (- Start Delay Timer)<br>(- Reset Attempt Count)<br>- Indicate Successful Transmission | 605 Delay No Wait |
| 604 Defer No Wait | 631 Data Request | - Construct Frame | 608 Defer Wait |
| | 632 Carrier Off | - Reset Delay Timer | 605 Delay No Wait |
| 605 Delay No Wait | 635 Data Request | - Construct Frame | 609 Delay Wait |
| | 625 Delay Timeout | - No Action | 602 Idle |
| | 628 Dummy CRS | - Reset Delay Timer<br>- Start Backoff Timer | 606 Backoff No Wait |
| | 627 Carrier On 2/3 | - Reset Delay Timer | 604 Defer No Wait |
| 608 Defer Wait | 641 Carrier Off | - Start Delay Timer | 609 Delay Wait |
| 609 Delay Wait | 644 Delay Timeout | - Start Frame Transmission<br>- Reset Delay Timer | 603 Transmit |
| | 639 Dummy CRS | - Reset Delay Timer<br>- Start Backoff Timer | 610 Backoff Wait |
| | 638 Carrier On 2/3 | - Reset Delay Timer | 608 Defer Wait |
| 606 Backoff No Wait | 636 Delay Timeout | - Construct Frame | 610 Backoff Wait |
| | 629 Carrier On 2/3 | - Reset DCRS | 607 Backoff Defer No Wait |
| | 633 Backoff Timeout | - Reset DCRS | 605 Delay No Wait |
| 610 Backoff Wait | 640 Carrier On | - Reset DCRS | 611 Backoff Defer Wait |
| | 642 Backoff Timeout | - Reset DCRS<br>- Start Delay Timer | 609 Delay Wait |
| 607 Backoff Defer No Wait | 637 Data Request | - Construct Frame | 611 Backoff Defer Wait |
| | 634 Carrier Off | - No Action | 606 Backoff No Wait |
| | 630 Backoff Timeout | - Start Backoff Timer | 607 Backoff Defer No Wait |
| 611 Backoff Defer Wait | 643 Carrier Off | - No Action | 610 Backoff Wait |
| | 645 Backoff Timeout | - Start Backoff Timer | 611 Backoff Defer Wait |

FIG. 21

| STATE | EVENT | ACTION | NEXT STATE |
|---|---|---|---|
| 801 Idle | 821 Carrier On | - Start Backoff Timer | 811 Backoff Defer XX Wait |
| 811 Backoff Defer XX Wait | 823 Carrier Off | - Start IFG 2/3 Timer | 812 Backoff IFG 2/3 Delay Defer XX Wait |
|  | 822 Backoff Timeout | | 811 Backoff Defer XX Wait |
| 812 Backoff IFG 2/3 Delay Defer XX Wait | 825 IFG 2/3 Timeout | - Reset IFG 2/3 Timer<br>- Active DCRS | 813 Backoff XX Wait |
|  | 824 Backoff Timeout | - Start Backoff Timer<br>or Inactive DCRS | 812 Backoff IFG 2/3 Delay Defer XX Wait |
| 813 Backoff XX Wait | 827 Backoff Timeout | - Inactive DCRS | 801 Idle |
|  | 826 Carrier On | - Inactive DCRS | 811 Backoff Defer XX Wait |

FIG. 22

| STATE | EVENT | ACTION | NEXT STATE |
|---|---|---|---|
| 1001 Start | 1011 Initialize | - Perform Initialization | 1002 Idle |
| 1002 Idle | 1012 Data Request | - Construct Frame<br>- Start Frame Transmission<br>- Start Backoff Timer | 1003 Transmit |
|  | 1014 Carrier On | (- No Action) | 1004 (Backoff) Defer No Wait |
| 1003 Transmit | 1017 Transmit Done | (- Start Delay Timer)<br>(- Reset Attempt Count)<br>- Indicate Successful Transmission | 1005 Delay No Wait |
| 1004 (Backoff) Defer No Wait | 1022 Data Request<br>1019 Carrier Off<br>1025 Backoff Timeout | - Construct Frame<br>- Start Delay Timer<br>- Start Backoff Timer | 1007 (Backoff) Defer Wait<br>1005 Delay No Wait<br>1004 (Backoff) Defer No Wait |
| 1005 Delay No Wait | 1021 Data Request<br>1015 Delay Timeout<br>1018 Dummy CRS<br>1016 Carrier On 2/3 | - Construct Frame<br>- No Action<br>- Reset Delay Timer<br>- Reset Delay Timer<br>- Start Backoff Timer | 1008 Delay Wait<br>1002 Idle<br>1006 Backoff No Wait<br>1004 (Backoff) Defer No Wait |
| 1007 (Backoff) Defer Wait | 1029 Carrier Off<br>1026 Backoff Timeout | - Start Delay Timer<br>- Start Backoff Timer | 1008 Delay Wait<br>1007 (Backoff) Defer Wait |
| 1008 Delay Wait | 1013 Delay Timeout<br>1029 Dummy CRS<br>1027 Carrier On 2/3 | - Start Frame Transmission<br>- Reset Delay Timer<br>- Reset Delay Timer<br>- Start Backoff Timer | 1003 Transmit<br>1009 Backoff Wait<br>1007 (Backoff) Defer Wait |
| 1006 Backoff No Wait | 1024 Data Request<br>1023 Carrier On<br>1020 Backoff Timeout | - Construct Frame<br>- Reset DCRS<br>- Reset DCRS<br>- Start Delay Timer | 1009 Backoff Wait<br>1004 (Backoff) Defer No Wait<br>1005 Delay No Wait |
| 1009 Backoff Wait | 1031 Carrier On<br>1030 Backoff Timeout | - Reset DCRS<br>- Reset DCRS<br>- Start Delay Timer | 1007 (Backoff) Defer Wait<br>1008 Delay Wait |

FIG. 24 (PRIOR ART)

| STATE | EVENT | ACTION | NEXT STATE |
|---|---|---|---|
| 1101 Start | 1121 Initialize | - Perform Initialization | 1101 Idle |
| 1102 Idle | 1122 Data Request | - Construct Frame<br>- Start Frame Transmission | 1103 Transmit |
|  | 1123 Carrier On | - No Action | 1105 Defer No Wait |
| 1103 Transmit | 1141 Preamble Done AND Collision Detect Up | - Start Jam Transmission<br>- Increment Attempt Count | 1104 Jam |
|  | 1125 Transmit Done | - Start Delay Timer<br>- Reset Attempt Count<br>- Indicate Successful Transmission | 1105 Defer No Wait |
| 1104 Jam | 1128 Transmit Done | - Start Delay Timer<br>- Start Backoff Timer | 1109 Backoff Delay |
|  | 1126 Excessive Collision | - Start Delay Timer<br>- Indicate Transmit Excessive Collision | 1107 Delay No Wait |
| 1110 Backoff | 1135 Carrier On | - No Action | 1111 Backoff Defer |
|  | 1136 Backoff Timeout | - Start Frame Transmission | 1103 Transmit |
| 1111 Backoff Defer | 1139 Carrier Off | - Start Delay Timer | 1109 Backoff Delay |
|  | 1140 Backoff Timeout | - No Action | 1106 Defer Wait |
| 1109 Backoff Delay | 1134 Carrier On | - Stop Delay Timer | 1111 Backoff Defer |
|  | 1130 Delay Timeout | - No Action | 1110 Backoff |
|  | 1138 Backoff Timeout | - No Action | 1106 Delay Wait |
| 1105 Defer No Wait | 1131 Data Request | - Construct Frame | 1106 Defer Wait |
|  | 1129 Carrier Off | - Start Delay Timer | 1107 Delay No Wait |
| 1107 Delay No Wait | 1132 Data Request | - Construct Frame | 1106 Delay Wait |
|  | 1124 Delay Timeout | - No Action | 1102 Idle |
| 1106 Defer Wait | 1137 Carrier Off | - Start Delay Timer | 1106 Delay Wait |
| 1106 Delay Wait | 1133 Delay Timeout | - Start Frame Transmission | 1103 Transmit |

PROTOCOL CONVERSION SYSTEM

BACKGROUND OF THE INVENTION

1. Field of the Invention

The present invention relates generally to a multiple access system in a data communication. The present invention relates to a protocol conversion for converting one protocol, such as a protocol realizing CSMA/CD (Carrier Sense Multiple Access/Collision Detection) system, into another protocol, such as a protocol realizing CSMA/CA (Carrier Sense Multiple Access/Collision Avoidance).

2. Description of the Related Art

In the conventional LAN (Local Area Network), CSMA/CD system has been employed. However, this carrier sense system cannot be applied for radio communication. The reason is as follow. In the wired communication network, state of a line can be monitored during transmission by own terminal. Therefore, collision in communication can be detected. However, in case of the radio communication network, since a received signal power is much smaller than the transmission signal power, it is not possible to monitor the line during transmission of the own terminal.

In general, as an access system in the carrier sense system, CSMA/CA system has been considered to be effective.

Then, an LSI level circuit realizing the CSMA/CA system is not available at the present. Currently, only CSMA/CD communications controller (LANCE LSI chip is available as the carrier sense system. The LANCE LSI chip has been designed on the basis of IEEE 802.3. FIG. 23 shows state transition, and FIG. 24 shows state transition matrix.

As set forth above, at the present, only CSMA/CD communications controller (LANCE LSI chip) is available, and no LSI level circuit for CSMA/CA is currently available.

It should be noted that U. S. Pat. No. 5,164,942 discloses a system for realizing the CSMA/CA utilizing the conventional CSMA/CD.

SUMMARY OF THE INVENTION

The present invention has been worked out for solving the problems set forth above. Therefore, it is an object of the present invention to provide a protocol conversion system which can easily realize a CSMA/CA system by adding at preceding stage to a CSMA/CD system.

Another object of the present invention is to provide a protocol conversion system which can easily realize switching of CSMA/CD system and CSMA/CA system.

According to the first aspect of the invention, a protocol conversion system to be added to a circuit for realizing a protocol in a CSMA/CD system for converting the protocol in the CSMA/CD system into a protocol in a CSMA/CA system, comprises:

first counting means for performing counting for a first period from a timing of termination of a carrier sense signal indicative of input of a reception signal of a data;

random number generating means for generating a random number;

second counting means for performing counting for a period corresponding to a value of the random number generated by the random number generating means after termination of counting by the first counting means;

reset means for forcedly stopping the first and second counting means at a timing of beginning of the carrier sense signal; and dummy signal generating means for generating a pseudo receive data while the second counting means is active for counting.

According to the second aspect of the invention, a protocol conversion system to be added to a circuit for realizing a protocol in a CSMA/CD system for converting the protocol in the CSMA/CD system into a protocol in a CSMA/CA system, comprises:

first counting means for performing counting for a first period from a timing of termination of a carrier sense signal indicative of input of a reception signal of a data;

random number generating means for generating a random number;

second counting means for performing counting for a period corresponding to a value of the random number generated by the random number generating means after termination of counting by the first counting means;

restarting means for restarting the second counting means for counting for a period corresponding to the next random number generated by the random number generating means when the carrier sense signal is not terminated upon termination of counting of the second counting means;

reset means for forcedly stopping the first and second counting means at a timing of beginning of the carrier sense signal; and dummy signal generating means for generating a pseudo receive data when the second counting means is active for counting, the first counting means has terminated counting and the reception signal is terminated.

According to the third aspect of the invention, a protocol conversion system to be added to a circuit for realizing a protocol in a CSMA/CD system for converting the protocol in the CSMA/CD system into a protocol in a CSMA/CA system, comprises:

first counting means for performing counting for a first period from a timing of termination of a carrier sense signal indicative of input of a reception signal of a data;

random number generating means for generating a random number;

second counting means for performing counting for a period corresponding to a value of the random number generated by the random number generating means after termination of counting by the first counting means;

restarting means for restarting counting of the second counting means with the next random number upon termination of counting of the second counting means and when the carrier sense signal is not yet terminated;

reset means for forcedly stopping the first and second counting means at a timing of beginning of the carrier sense signal; and dummy signal generating means for generating a pseudo receive data when the second counting means is active for counting, the first counting means has terminated counting and the reception signal has also terminated.

In the preferred construction, the first counting means may become time out within a period shorter than or equal to ⅔ of an inter frame gap.

The protocol conversion system may further comprise means for triggering the first counting means by detecting termination of the carrier sense signal.

The dummy signal generating means may generates pseudo carrier sense signal and which system includes means for selectively outputs the carrier sense signal and the pseudo carrier sense signal. In the alternative, the dummy signal generating means may generate pseudo reception signal and which system includes means for selectively outputting the reception signal and the pseudo reception signal.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 17 is an illustration showing a state transition matrix in the first embodiment of the protocol conversion system;

FIG. 18 is an illustration showing a state transition matrix in the CSMA/CD system, to which the first embodiment of the protocol conversion system is applied;

FIG. 19 is an illustration showing a state transition matrix in the third embodiment of the protocol conversion system;

FIG. 20 is an illustration showing a state transition matrix in the CSMA/CD system, to which the third embodiment of the protocol conversion system is applied;

FIG. 21 is an illustration showing a state transition matrix in the fifth embodiment of the protocol conversion system;

FIG. 22 is an illustration showing a state transition matrix in the CSMA/CD system, to which the fifth embodiment of the protocol conversion system is applied;

FIG. 24 is an illustration showing a state transition matrix in the CSMA/CD system, to which the conventional protocol conversion system is applied.

DESCRIPTION OF THE PREFERRED EMBODIMENT

The preferred embodiment of the present invention will be discussed in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

Figure 12:
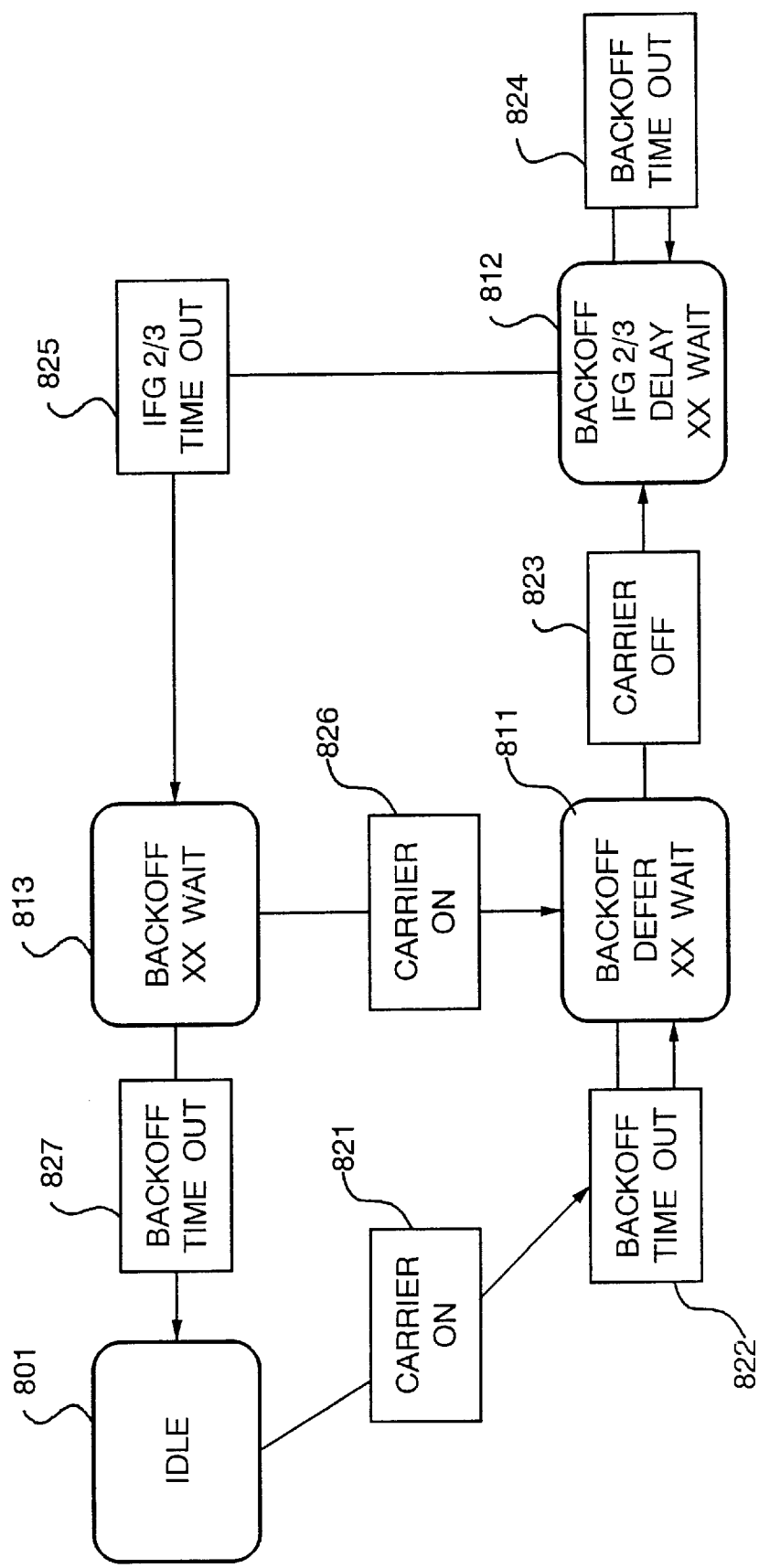
FIG. 12 is an illustration showing a state transition of the fifth embodiment of the protocol conversion system according to the present invention.

Since a CSMA/CA system cannot detect collision, the system may not transit to a jam state, a backoff state, a backoff delay state, a backoff defer state in a state transition diagram of a CSMA/CD system on the basis of IEEE 802.3 of FIG. 12. Therefore, in the present invention. Therefore, in the present invention, the CSMA/CA system is realized utilizing idle state, defer no wait state, defer wait state, delay no wait state, delay wait state, transmit state in the CSMA/CD system. Therefore, the present invention proposes a protocol conversion system for easily realizing CSMA/CA system by newly adding at the preceding stage of a CSMA/CD communication controller (LANCE LSI chip) and forcedly control presence and absence of data or carrier. By the forced control, the state transition of the CSMA/CD system is converted into the state transition of the CSMA/CA system.

Namely, in the protocol conversion system according to the present invention, when a transmission data is present, data transmission is controlled to perform transmission of data with deferring randomly generated different period for avoiding collision. By providing the protocol conversion system to the CSMA/CD communication controller (LANCE LSI chip) dummy carrier sense signal DCRS or dummy reception signal DRS is supplied to the LANCE LSI chip during collision avoidance defer period to appear as if some station performs transmission to the LANCE LSI chip.

Figure 2:
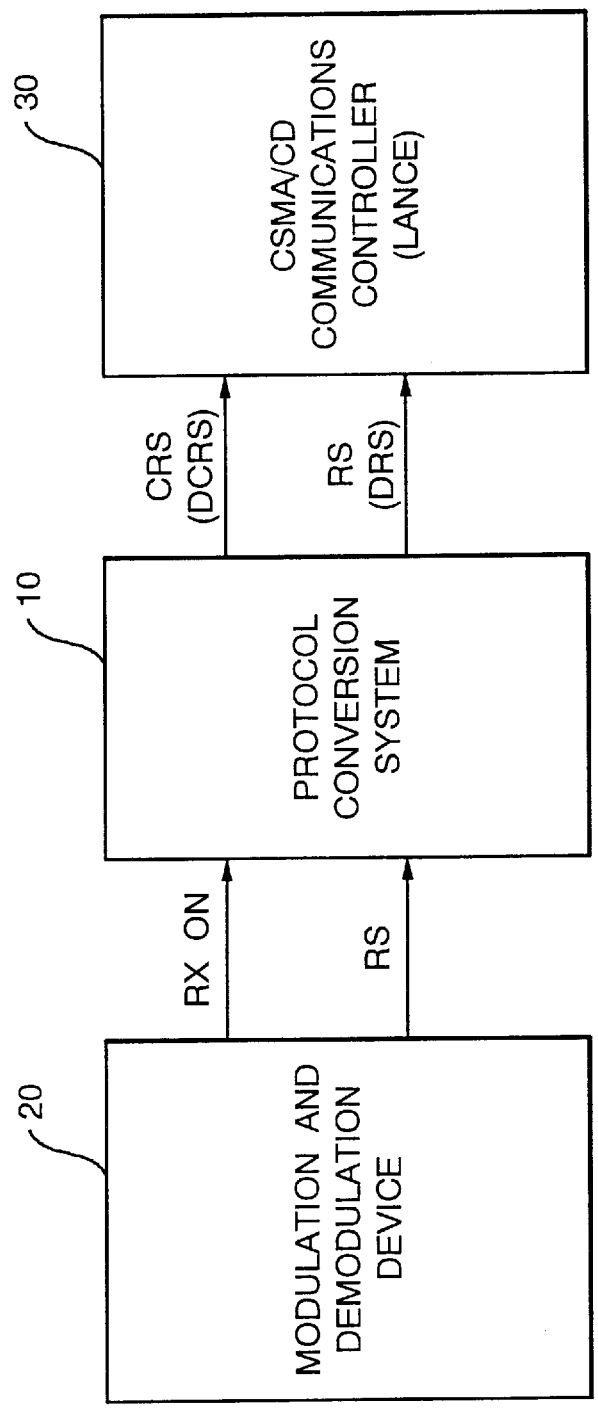
FIG. 2 is a conceptual illustration showing a condition where a CSMA/CD communication controller (LANCE LSI chip) in the protocol conversion system according to the invention.

FIG. 2 is a conceptual illustration showing a state where the protocol conversion system according to the present invention is added to the CSMA/CD communication controller (LANCE LSI chip). In a data communication by a wireless or radio communication, a reception signal RS and a reception detection signal RX ON from a modulation and demodulation device 20 performing data modulation and demodulation are input to a protocol conversion system 10, to which the present invention is applied. In the protocol conversion system 10 according to the present invention, presence or absence of the reception detection signal RX ON or the reception signal RS detection is controlled. As a result of control, a carrier sense signal CRS (or a dummy carrier sense signal DCRS) and the reception signal RS (or a dummy reception signal DRS) are transferred to the CSMA/CD communication controller (LANCE LSI chip) 30. By this, the state transition of the CSMA/CD system is converted into the state transition of the CSMA/CA system.

Figure 1:
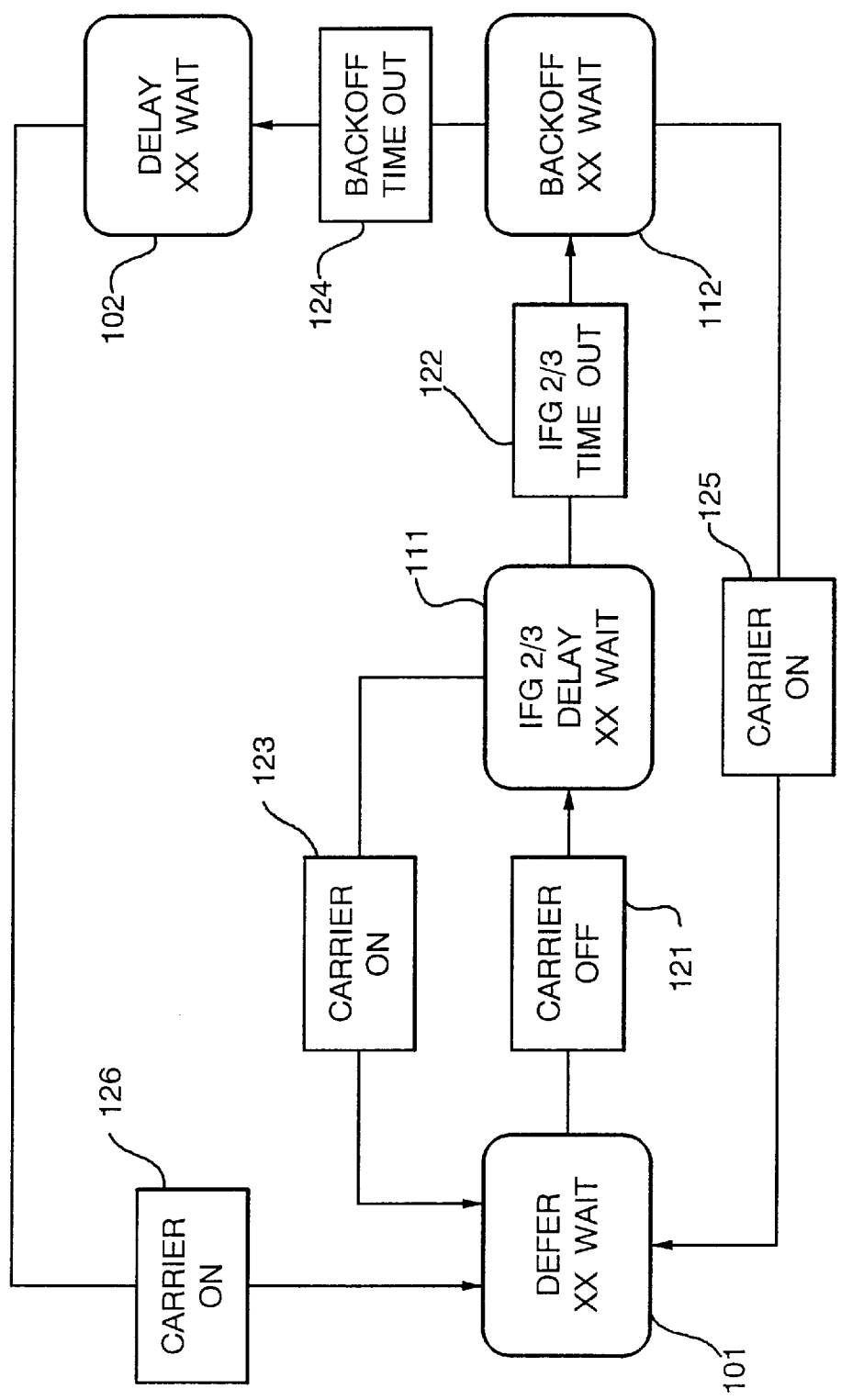
FIG. 1 is a schematic block diagram showing a state transition of the first embodiment of a protocol conversion system according to the present invention.

FIG. 1 is an illustration showing the state transition by the first embodiment of the protocol conversion system according to the present invention. The first embodiment of the protocol conversion system is realized by the state transition diagram and a state transition matrix illustrated in FIGS. 1 and 17.

In the state transition diagram of FIG. 1, by a state 101 of "Defer XX Wait (Defer Wait or Defer No Wait), an event "Carrier Off" 121 for terminating the carrier sense signal indicative of reception of data is generated. Then, a timer as a first counting means which at least becomes time out within a period shorter than or equal to ⅔ of an inter frame gap (IFG) is started. In FIGS. 1 and 17, XX represents the state either present or absent.

Time out of the timer as the first counting means causes an event 122 to initiate measurement of an elapsed time by a backoff timer as a second counting means which is active for a period corresponding to a value generated by a random number generating means. Then, the state transits to a state 112 of "Backoff XX wait (Backoff Wait or Backoff NO wait)". At the same time, the dummy carrier sense signal (DCRS) is generated. Upon time out of the backoff timer as the second counting means, an event 124 is caused to transit the state 102 of "Delay XX Wait (Delay Wait or Delay NO wait)" with terminating output of the dummy carrier sense signal.

On the other hand, when events 123, 125, 126 for again generating the carrier sense signal is caused in respective of the foregoing state, the state returns to the state 101 of "Defer XX wait" again to reset all actions.

The shown embodiment of the protocol conversion system can be realized by employing a microprocessor.

Figure 3:
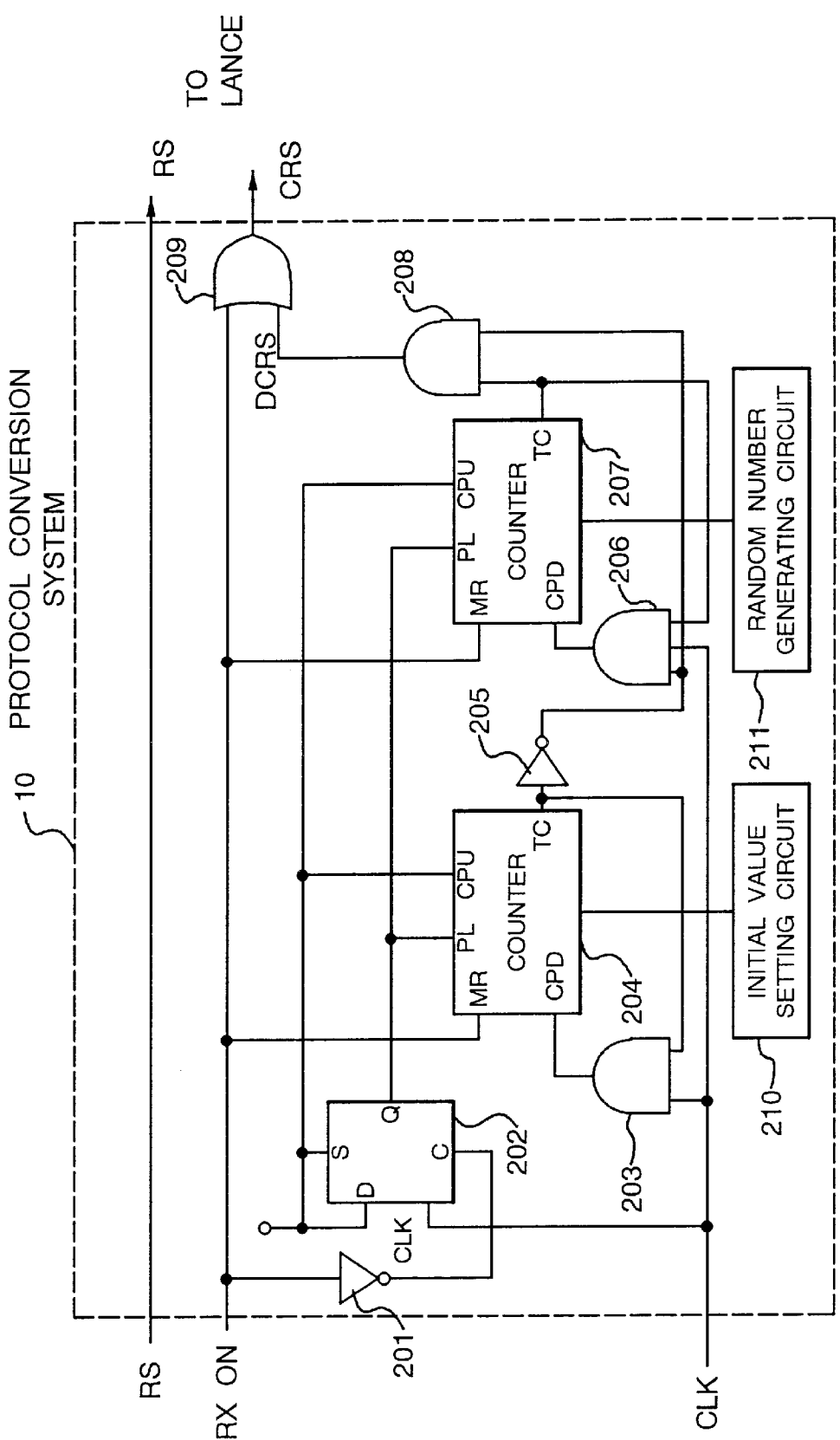
FIG. 3 is a schematic circuit diagram showing an example realizing the first embodiment of the protocol conversion system according to the invention.

FIG. 3 shows an example of a circuit which can realize the first embodiment of the protocol conversion system according to the present invention. In FIG. 3, both of counters 204 and 207 are TTL up/down counters. In the shown embodiment, these counters are employed as down counters.

The counter 204 counts down a value less than or equal to ⅔ of the IFG and serves as a timer which becomes time out at a period shorter than or equal to ⅔ of the IFG. To this counter 204, a count value (the value corresponding to ⅔ of the IFG) is loaded from an initial setting circuit 210.

The counter 204 is controlled the operation thereby by a control circuit which is constituted of an inverter 201, a flip-flop 202 and an AND circuit 023. Namely, the counter 204 is initiated counting operation after turning OFF of the reception detection signal RX ON, at every occurrence. The counter 204 is stopped when the value loaded from the initial setting circuit 210 is reached.

On the other hand, the counter 207 is a counter serving as the backoff timer. To this counter 207, the random number value generated by a random number generator 211 is loaded. The random number generator 211 is realized by a typical PN generator. In the random number setting, a plurality of counter values are preliminarily set. The random number generator 211 randomly generates arbitrary counter value among a preliminarily set plurality of random numbers. The random number generator 211 then feeds the generated random number to the counter 207.

In the system of FIG. 3, while the counter 204 is terminated the counting operation and the counter 207 is active, the dummy carrier sensor signal DCRS is generated by the AND circuit 208. Then, at the next stage, OR condition between the dummy carrier sense signal DCRS and a real carrier sense signal CRS by an OR circuit 209. The output of the OR circuit 209 is transferred to the CSMA/CD communication controller (LANCE LSI chip) at the next stage. As the LANCE LSI chip, AM7992, DP8390D, NS32490D or so forth is typically employed.

Figure 4:
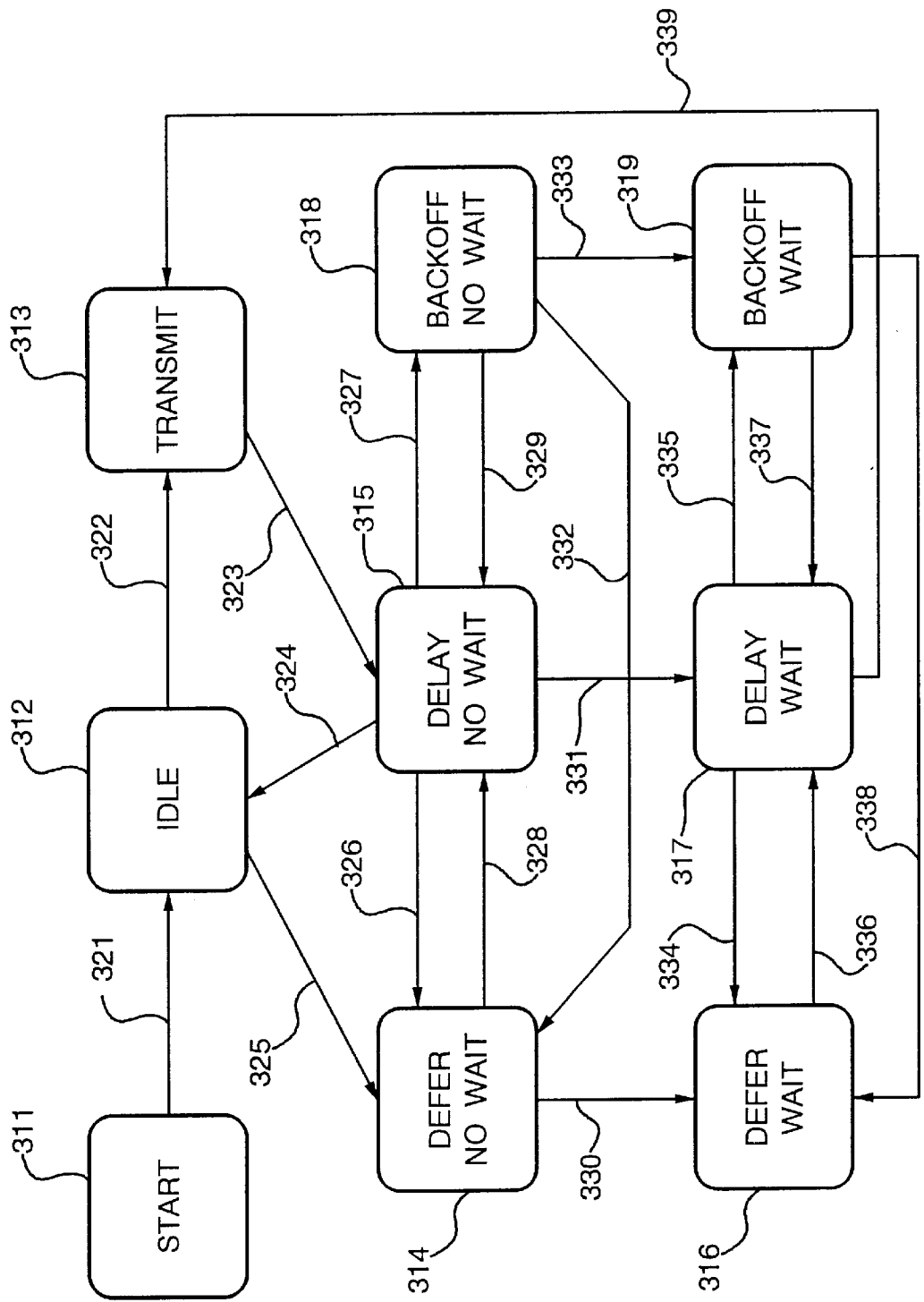
FIG. 4 is an illustration showing a state transition when the first embodiment of the protocol conversion system of the invention is applied to the CSMA/CD system.
Figure 23:
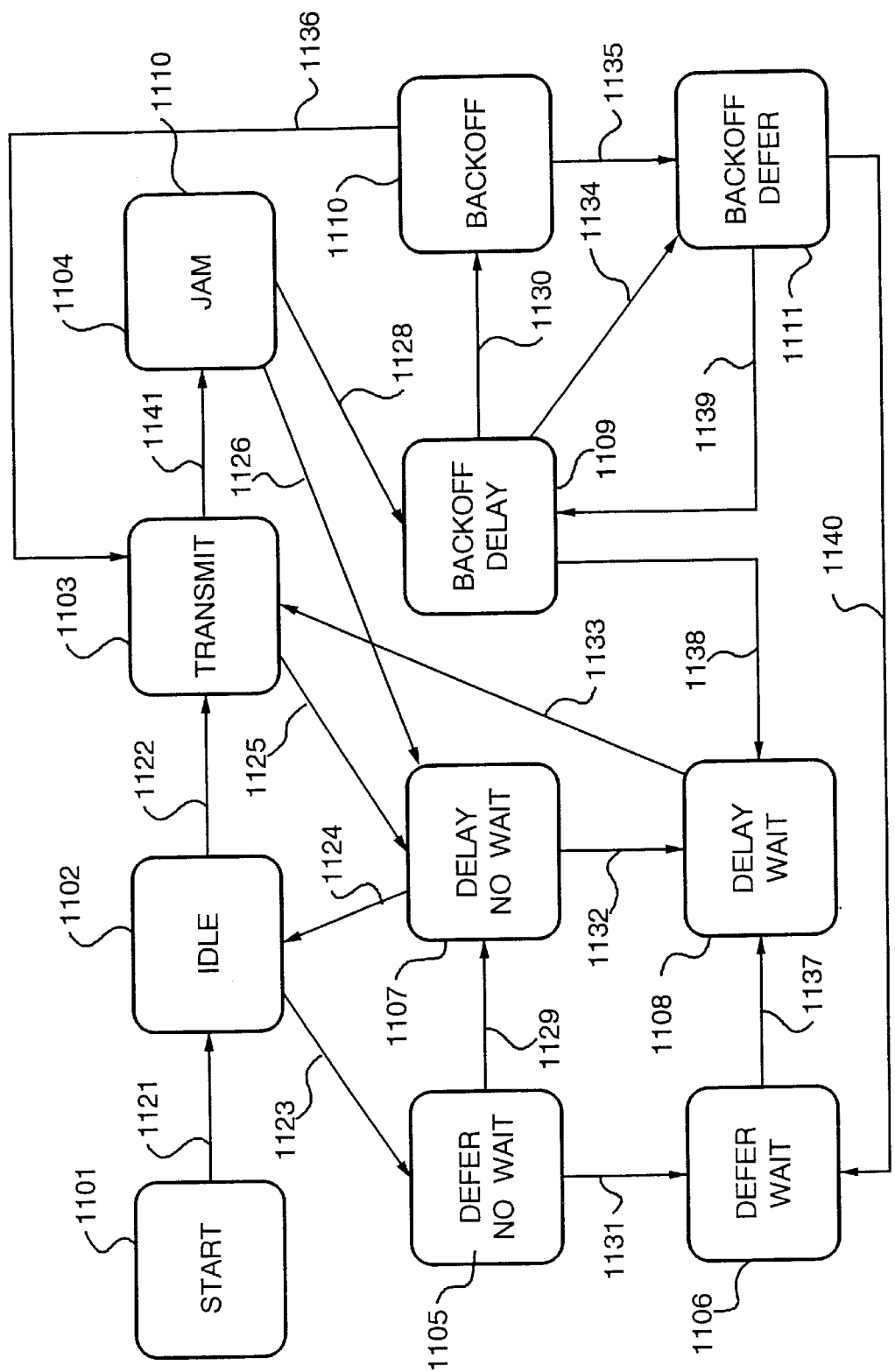
FIG. 23 is an illustration showing a state transition matrix in the conventional protocol conversion system.

By adding the shown embodiment of the protocol conversion system realizing the state transition of FIG. 1 to the LANCE LSI chip, the state transition of FIG. 23 and state transition matrix as defined in IEEE 802.3 can be converted into the state transition and state transition matrix as illustrated in FIGS. 4 and 18. In the state transition of FIG. 23, state will not transit to states 1104, 1109, 1110, 1111 which are caused at the occurrence of collision, in the CSMA/CA system, those states are neglected in the system of FIG. 4. On the other hand, "Backoff No Wait" state 317 and Backoff Wait state 318 are newly added.

When events 328, 326 of carrier off are caused from "Defer No Wait" state 314 and "Defer Wait" state 315, state transition shown in FIG. 1 is active to cause evens 327, 335 which inherently cause dummy carrier sense DCRS to insert the backoff timer after carrier off.

Figure 5:
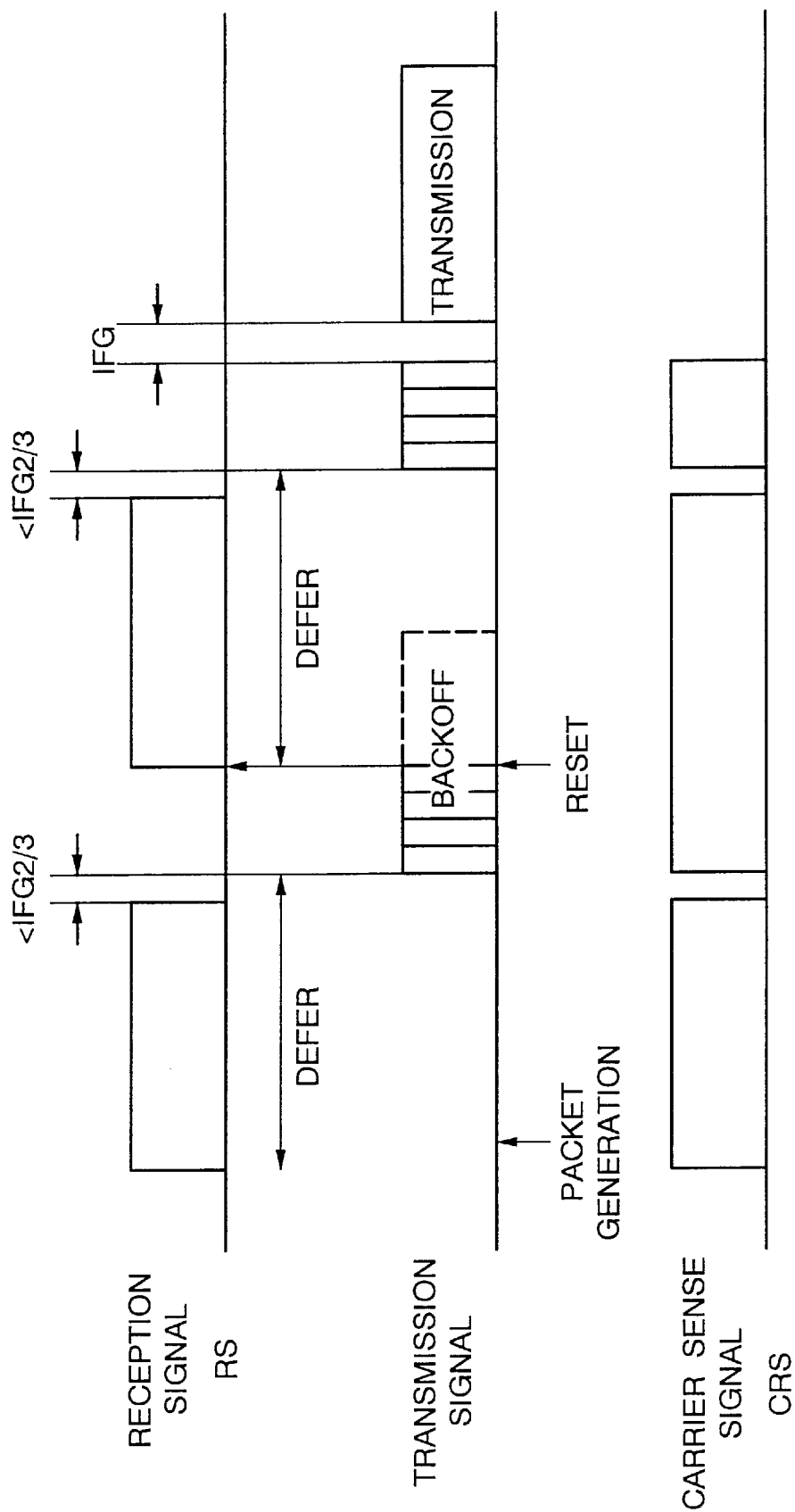
FIG. 5 is a timing chart showing an example of operation of the CSMA/CD system of FIG. 4, in a time axis.

An example of operation on the time axis by the above-mentioned state transition is illustrated in FIG. 5. While receiving signal from remote station, the carrier sense signal CRS due to presence of the reception signal is present. Then, the state becomes the "Defer Wait" state. When reception is terminated, the line becomes empty for a period shorter than or equal to ⅔ of the IFG and the real carrier sense signal is once disappear. However, subsequently, since the state transits to the backoff state, the dummy carrier sense signal appears. In the example of FIG. 5, there is illustrated a state where the signal from remote station is received before time out of the backoff timer. In this case, the backoff timer is reset. However, since the carrier sense signal CRS is present for the presence of the reception signal, in combination of the preceding dummy carrier sense signal, the carrier sense signal nominally appears to be continuous. When the reception signal is terminated, the backoff timer becomes active, again. In the drawing, there is illustrated the state where transmission is initiated before reception of signal from remote station since the backoff timer becomes time out at earlier timing than reception of signal from remote station.

The second embodiment of the protocol conversion system according to the present invention is realized by replacing generation of the dummy carrier signal DCRS in the state transition diagram in FIG. 1 and state transition matrix in FIG. 17 with dummy reception signal DRS.

Figure 6:
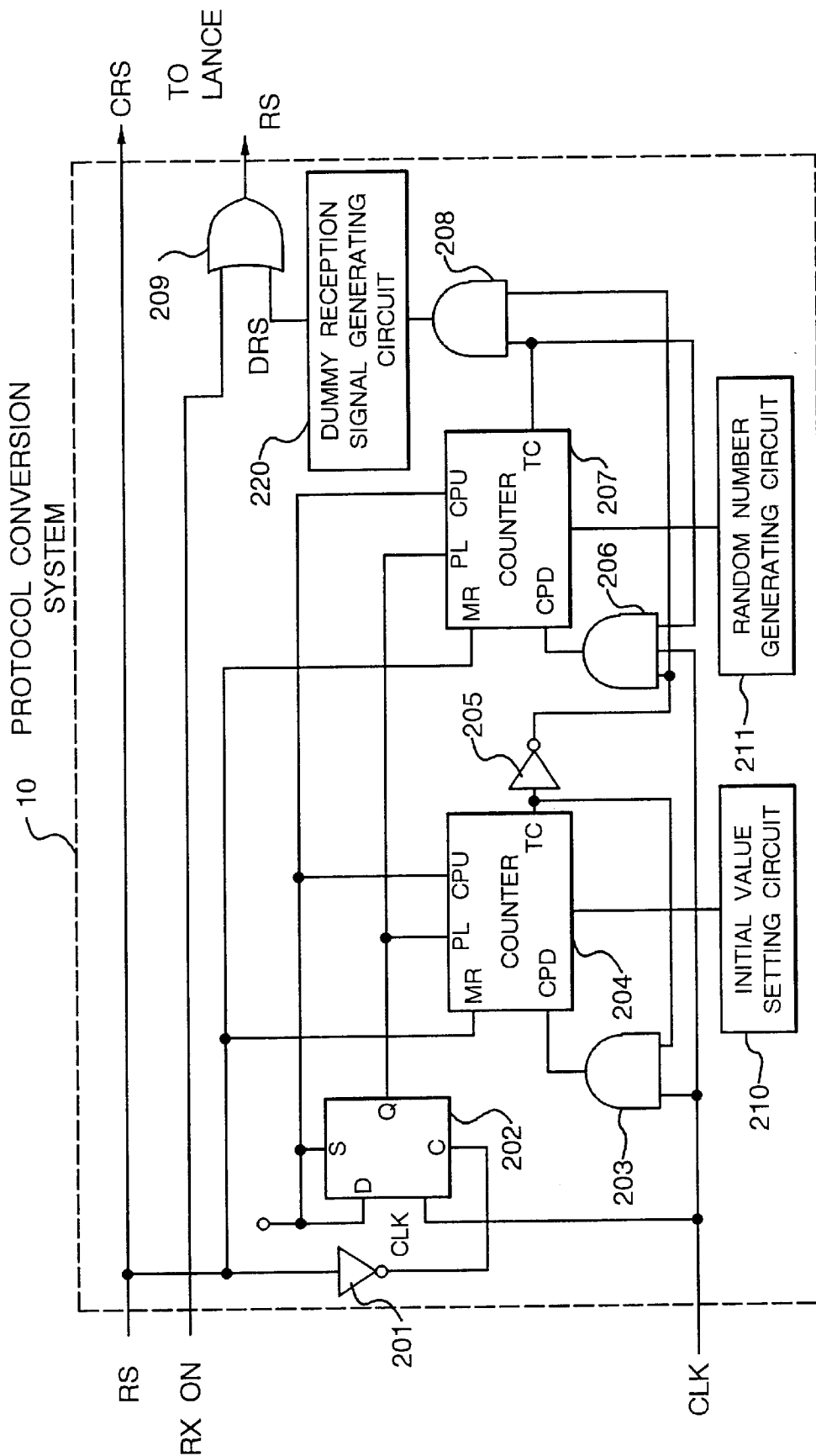
FIG. 6 is a schematic circuit diagram for an example of the circuit realizing the second embodiment of the protocol conversion system according to the invention.

FIG. 6 shows an example of a circuit realizing the second embodiment of the protocol conversion system according to the present invention.

In the circuit of FIG. 6, the reception detection signal RX ON of the first embodiment shown in FIG. 3 is input to the CSMA/CD communication controller (LANCE LSI chip) as the carrier sense signal and used for operation of the shown circuit. Accordingly, the reception detection signal RX ON is not input to the OR circuit 209.

On the other hand, in the shown embodiment, a dummy reception signal generating circuit 220 is provided for outputting the dummy reception signal in the active state of the AND circuit 208, is provided. When the AND circuit 208 becomes active, the dummy reception signal generating circuit 220 becomes active. Then, OR of the output (dummy reception signal DRS) of the dummy reception signal generating circuit and the real reception signal RS is taken by the OR circuit 209. By inputting these signals to the terminals of the LANCE LSI chip defined as AUI interface, the state transition operation shown in FIGS. 4 and 18 can be realized.

Figure 7:
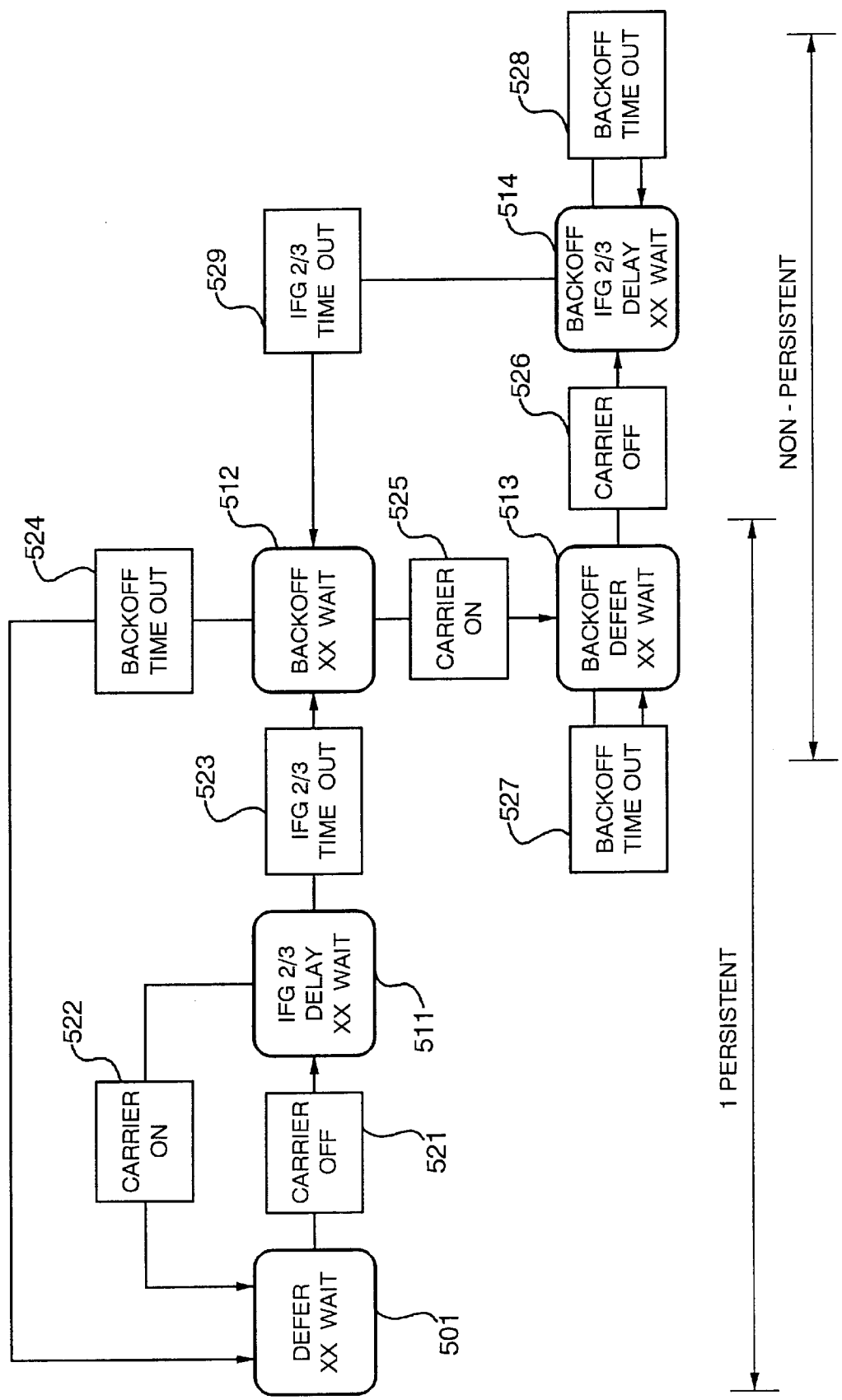
FIG. 7 is an illustration showing a state transition in the third embodiment of the protocol conversion system according to the invention.

The third embodiment of the protocol conversion system according to the present invention can be realized by the state transition and the state transition matrix as illustrated in FIGS. 7 and 19.

From "Defer XX Wait" state 501, when an event for terminating the carrier sense signal indicative of reception of data is caused, a timer as the first counting means which becomes time out within a period shorter than or equal to $2/3$ of the IFG, is started. Thus, the state transits to "Delay XX Wait" state 511. The state 511 will be hereinafter referred to as the IFG $2/3$ Delay XX Wait. When the timer causes an event 523 of time out, the backoff timer as the second counting means which is maintained active for a period corresponding to the value generated by the random number generating means, is initiated. Then, the state transits to "Backoff XX Wait (Backoff Wait or Backoff No Wait)" 512. In conjunction therewith, the dummy carrier sense signal (DCRS) is generated.

When the backoff timer causes an event 524 of time out, generation of the dummy carrier sense signal is terminated to transit the state 501 of "Defer XX Wait". On the other hand, from the "Delay XX Wait" state for the period shorter than or equal to $2/3$ of the IFG, if the event 522 for generating the carrier sense signal again, is caused, the state returns to "Defer XX Wait" state 501 to reset all action.

When an event 525 to generate the carrier sense signal indicative of reception of data from the state 512 of "Backoff XX Wait (Backoff Wait or Backoff No Wait), the backoff timer as the second counting means which is maintained active for a period corresponding to the value generated by the random number generating means, is initiated to transit to the state 513 Backoff XX Wait (Backoff Wait or Backoff No Wait). When an event 526 indicative of termination of the carrier sense signal occurs, timer as the first counting means which becomes time out within a period shorter than or equal to $2/3$ of the IFG, is started. Then, the state transits to "Backoff IFG $2/3$ Delay XX Wait (Backoff $2/3$ IFG Delay Wait or Backoff IFG $2/3$ Delay No Wait)" state 514. When an event 529 to cause time out of the timer occurs, the state transits to "Backoff XX Wait" state 512. Then, the backoff timer wait for occurrence of an event. In conjunction therewith, the dummy carrier signal (DCRS) is generated.

When the backoff timer causes an event 524 of time out, the state transits to "Defer XX Wait" state 501 with terminating generation of the dummy carrier sense signal. When the carrier sense signal is caused by reception of the signal from remote station. Then, generation of the dummy carrier sense signal is terminated and the state transits to "Backoff defer XX Wait" state 513. At the state 513 of "Backoff Defer XX Wait" or the state 514 of "Backoff Defer XX Wait", if events 527, 528 of time out of the backoff timer, the random number is again obtained to be re-initiate to initiate operation and to maintain the state.

Figure 8:
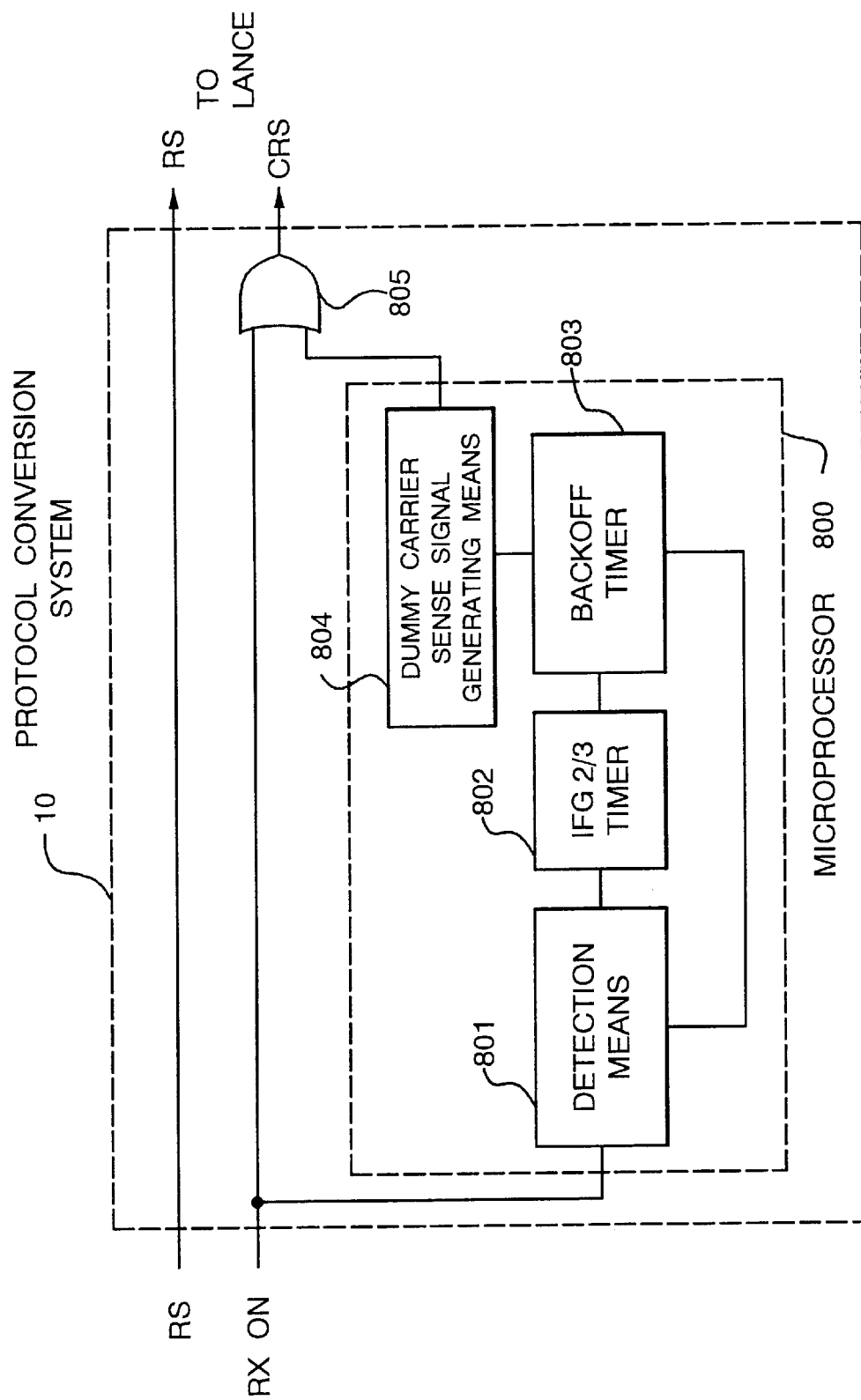
FIG. 8 is a schematic block diagram showing an example of the circuit realizing the third embodiment of the protocol conversion system according to the invention.

The shown embodiment of the protocol conversion system can be realized with employing the microprocessor. FIG. 8 is a schematic and discrete block diagram showing an example of implementation of the third embodiment of the protocol conversion system according to the present invention with the microprocessor. In FIG. 8, a microprocessor 800 comprises a detection means 801 for detecting presence or absence of the reception detection signal RX ON. an IFG $2/3$ timer 802 which becomes time out at a period corresponding to $2/3$ of the IFG, a backoff timer 803, a dummy carrier sense signal generating means 804 and an OR circuit 805.

In the IFG $2/3$ timer 802, an initial value (corresponding to $2/3$ of the IFG) is preliminarily set. Namely, the IFG $2/3$ timer 802 is triggered by the detection means 801 after being turned off by the reception detection signal RX ON and stops after the count corresponding to the initial value. The backoff timer 803 performs counting for a value corresponding to a plurality of ransom numbers which are preliminarily set. On the other hand, the dummy carrier sense signal generating means 804 generates the dummy carrier sense signal DCRS to output to the OR circuit 805. The dummy carrier sense signal DCRS is compared with the real carrier sense signal CRS in the OR circuit 805. The OR output of the OR circuit 805 is then transferred to the CSMA/CD communication controller (LANCE LSI chip) in the next stage.

Figure 9:
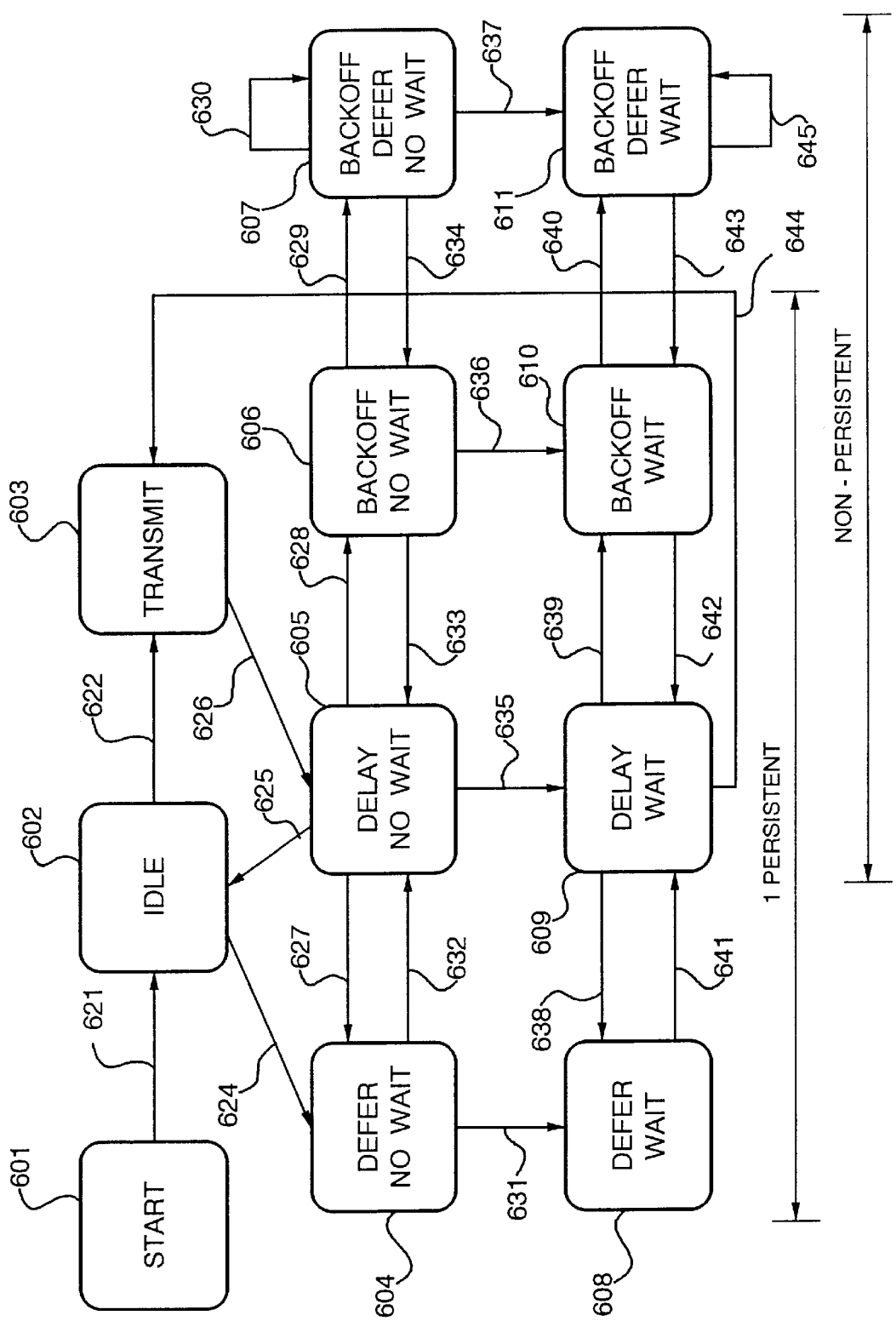
FIG. 9 is an illustration showing a state transition when the third embodiment of the protocol conversion system of the invention is applied to the CSMA/CD system.

By adding the shown embodiment of the protocol conversion system realizing the above-mentioned state transition, the state transition of FIG. 23 and the state transition matrix of FIG. 24 can be converted as illustrated in FIGS. 9 and 20.

In the state transition of the CSMA/CD system of FIG. 23, the state will not transit to states 1104, 1109, 1110 and 1111, transition to which is caused upon occurrence of collision, in the CSMA/CA system. On the other hand, "Backoff No Wait" state 606, "Backoff Defer No Wait" state 607, "Backoff Wait" state 61-0 and "Backoff Defer Wait" state 611 are added.

Upon occurrence of events 632, 641 for carrier off from "Backoff No Wait" state 606 or "Backoff Wait" state 610, the state transition of non-persistent becomes active. In the state of "Backoff Defer No Wait" state 607 or "Backoff Defer Wait" state 611, if the event 629 or 640 for carrier on occurs, the state is once transit to "Backoff No Wait" state 606 or "Backoff Wait" state 610. During this period, the backoff timer triggered by the event 629 or 640 for carrier on is held active. Then, when the backoff timer becomes time out in the state of "Backoff No Wait" 606 or "Backoff Wait" 610, by the event 633 or 642 of the backoff timer time out, state transition to an "Idle" state 602 or a "Transmit" state 603 via a "Delay No Wait" state 605 or "Delay Wait" State 609.

Figure 10:
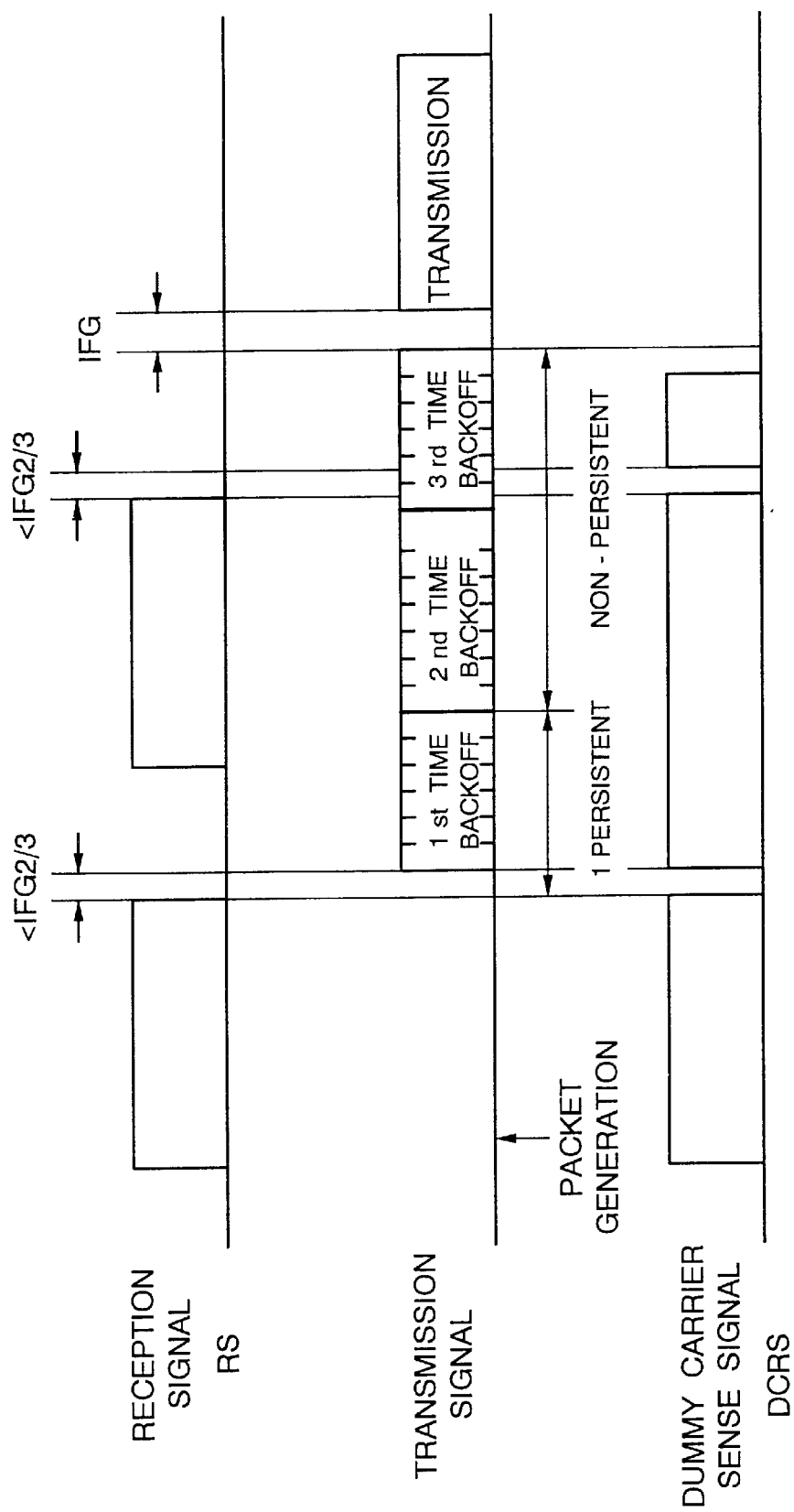
FIG. 10 is a timing chart showing an example of operation of the CSMA/CD system of FIG. 9 in a time axis.

An example of operation on the time axis in the state transition set forth above is illustrated in FIG. 10.

While a signal from the remote station is received, the carrier sense signal CRS is present for the presence of the reception signal. Then, when the state becomes "Defer Wait" state, reception is terminated. When line becomes vacant for a period shorter than or equal to $2/3$ of the IFG, the carrier sense signal CRS is once disappear. Subsequently, state enters into backoff state to cause the dummy carrier sense signal.

In the shown example illustrates the condition that the signal from the remote station is received subsequently, before termination of the backoff timer. In this case, the backoff timer is reset. However, since the real carrier sense signal CRS on the basis of the reception signal is present, in combination with the preceding dummy carrier sense signal DCRS, the carrier sense signal CRS nominally appears continuous. By this, during waiting period of "Collision Avoidance", it is recognized in the LANCE LSI chip as if the remote station transmits the signal. When the reception signal disappears, the backoff timer becomes active, again. In the drawing, since the backoff timer becomes time out before reception of signal from the remote station, transmission is initiated before reception of the signal from the remote station.

The fourth embodiment of the protocol conversion system according to the present invention can be realized by replacing generation of the dummy carrier sense signal in the state transition diagram of FIG. 7 and the state transition matrix of FIG. 19 in the third embodiment with generation of the dummy reception signal DRS.

Figure 11:
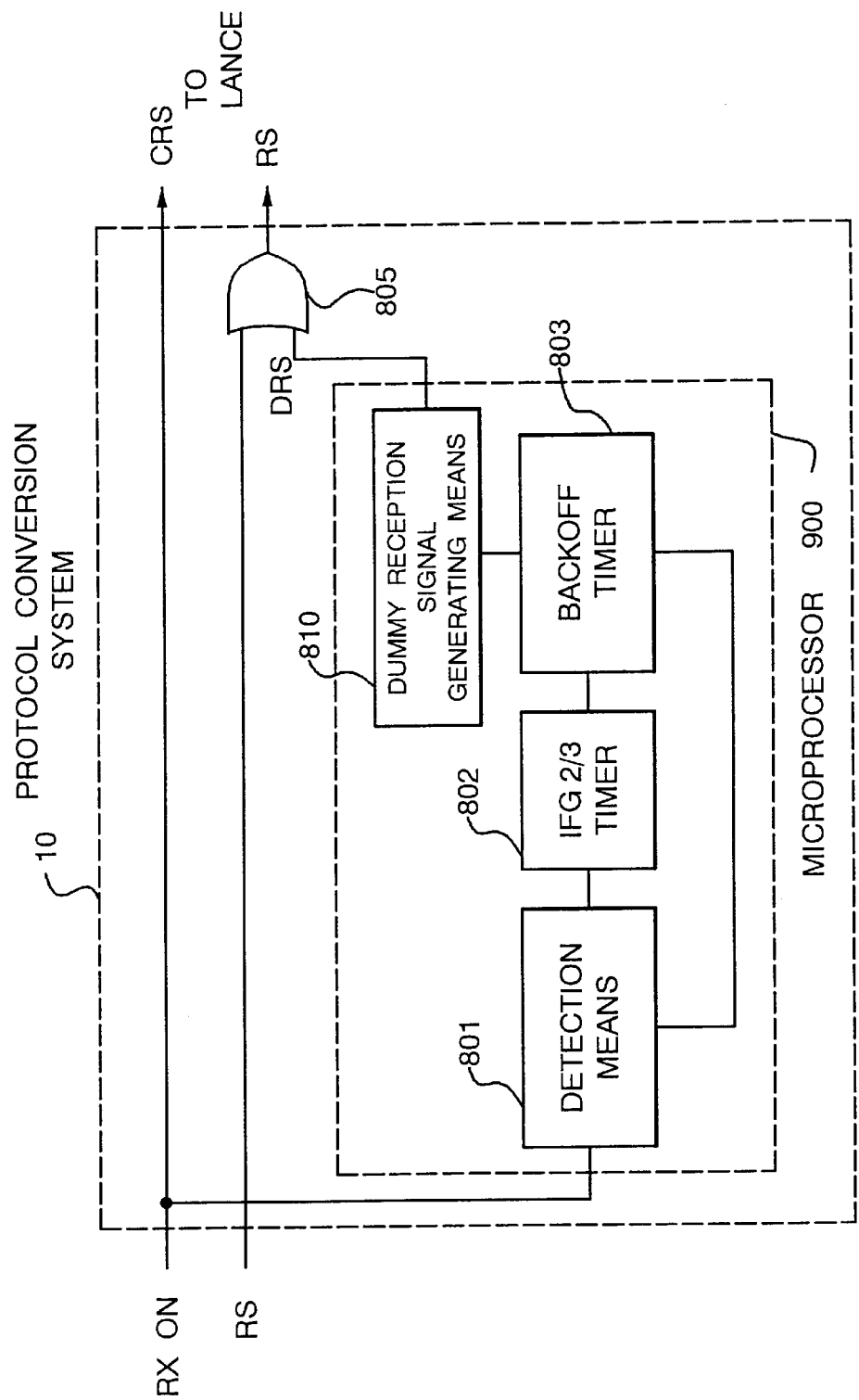
FIG. 11 is a schematic block diagram showing an example of the circuit for realizing the fourth embodiment of the protocol conversion system according to the invention.

FIG. 11 is a schematic block diagram showing an example implementing the fourth embodiment of the protocol conversion system according to the present invention, with a microprocessor. In FIG. 11, the microprocessor 900 comprises the detection means 801 for detecting presence and absence of reception detection signal RX ON, the IFG ⅔ timer 802 which becomes time out within the period shorter than or equal to ⅔ of the IFG, the backoff timer 803, the dummy reception signal generating means 810 and the OR circuit 805. Comparing the block diagram of the third embodiment shown in FIG. 8, in the embodiment of FIG. 11, the reception detection signal RX ON shown in FIG. 8 is input to the CSMA/CD communication controller (LANCE LSI chip) as the carrier sense signal CRS, as is, and serves for operation of the shown circuit. Accordingly, the reception detection signal RX ON is not input to the OR circuit 805.

Then, in place of the dummy carrier sense signal generating means 804, a dummy reception signal generating means 810 outputting the dummy reception signal DRS is provided. OR of the output (dummy reception signal DRS) of the dummy reception signal generating means 810 and the real reception signal RS is taken by the OR circuit 805. By inputting these signals to the terminal of the LANCE LSI chip defines by AUI interface, the operation of the state transition shown in FIGS. 9 and 20 can be realized.

The fifth embodiment of the protocol conversion system of the present invention can be realized by the state transition and the state transition matrix of FIGS. 12 and 21.

When the event 821 generating the carrier access signal indicative of reception of data from the state of "Idle" 801, the backoff timer as the second counting means becomes active for a period corresponding to the value generated by the random number generating means. Thus, the state transit to "Backoff Defer XX Wait" state 811.

When the carrier sense signal is terminated and thus the event 823 occurs, the timer as the first counting means which becomes time out within a period shorter than or equal to ⅔ of the IFG is started. Time out of the timer causes event 825. Then, the state transit to "Backoff XX Wait" state 813. Then, the backoff timer is initiated operation for waiting occurrence of event upon time out thereof. In conjunction therewith, the dummy carrier sense signal DCRS is generated.

When the event 827 of time out is caused by the backoff timer, generation of the dummy carrier sense signal is terminated and the state transit to the "Idle" state "Idle" state 801. When the carrier sense signal appears for reception of the signal from the remote station in the state 813 of Backoff XX Wait", generation of the dummy carrier sense signal DCRS is terminated to transit the state 811 of "Backoff Defer XX Wait". On the other hand, at the state 811 of "Backoff Defer XX Wait" or the state 812 of "Backoff IFG ⅔ Delay XX Wait", if the event 822 or 824 of time out of the backoff timer is caused, the backoff timer is initiated again with taking another random number to maintain the state.

The shown embodiment of the protocol conversion system according to the present invention can be implemented by employing a microprocessor.

Figure 13:
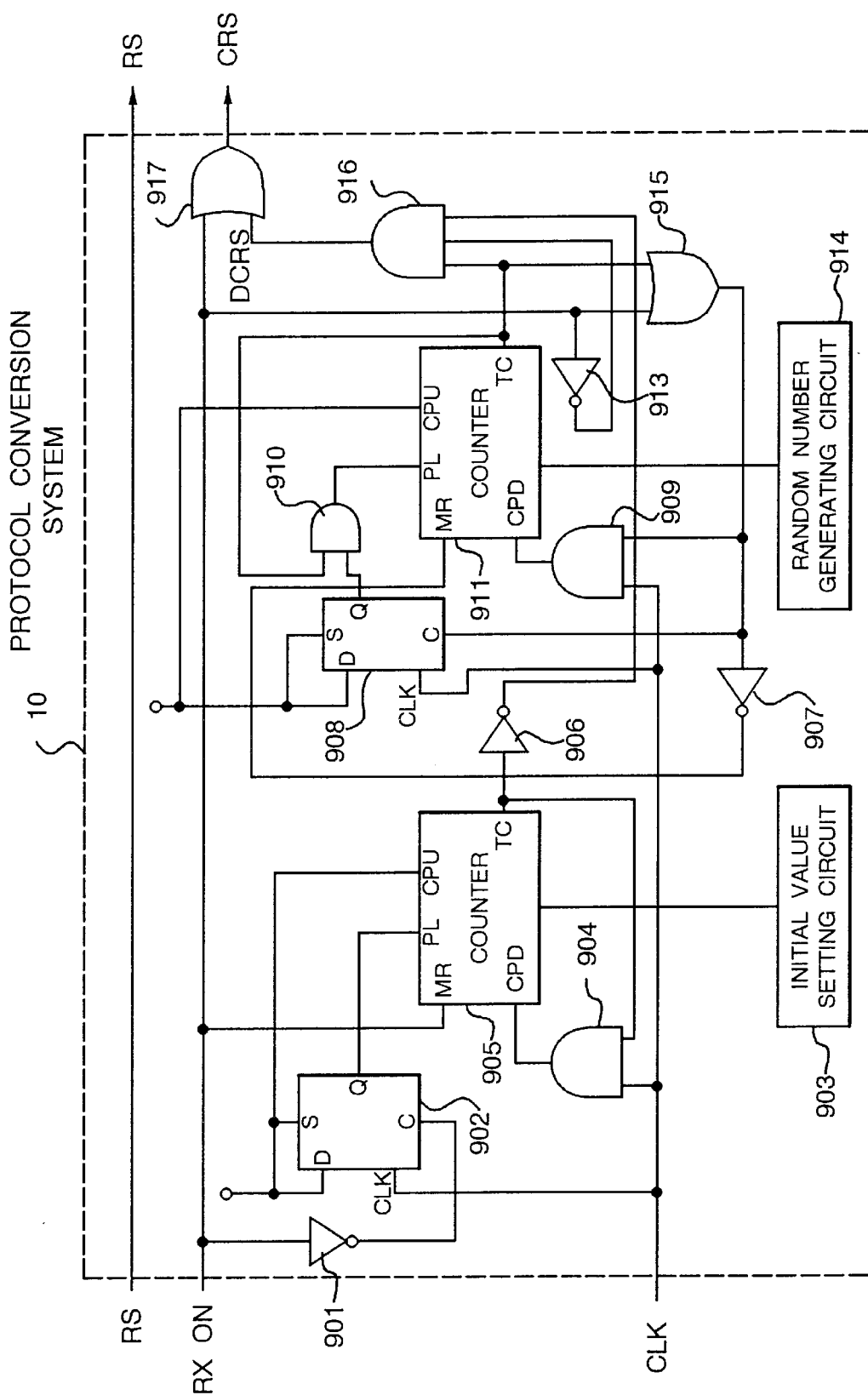
FIG. 13 is a schematic circuit diagram of a circuit for realizing the fifth embodiment of the protocol conversion system according to the invention.

FIG. 13 shows an example of a circuit implementing the fifth embodiment of the protocol conversion system according to the invention. In the shown embodiment of FIG. 13, counters 905 and 911 are both TTL up/down counters. In the shown embodiment, these counters are employed as down counters. The counter 905 is adapted to down count a value corresponding to a period shorter than or equal to ⅔ of the IFG and functions to become time out within the period shorter than or equal to ⅔ of the IFG. For this counter 905, a count value (the value corresponding to ⅔ of the IFG) is loaded from an initial setting circuit 903.

On the other hand, the counter 911 us a counter serving as the backoff counter. For this counter 911, a predetermined random number generated by a random number generator 914 is loaded. Typically, the random number generator 914 can be realized by a PN generator. For the random number generator 914, a plurality of mutually different values are prelimirily set as the random numbers. The random number generator 914 arbitrarily generate the arbitrary one of the preliminarily set counter values to output to the counter 911 as the generated random number.

As can be clear from the state transition diagram, the counters 905 and 911 operate independently of each other.

The counter 905 is controlled the operation by a control circuit comprising an inverter 901, a flip-flop 902 and an AND circuit 904. Namely, the counter 905 is initiated at every occurrence of turning off of the reception detection signal RX ON and terminates operation after counting of the value corresponding to the value loaded from the initial setting circuit 903.

On the other hand, the counter 911 is controlled by a control circuit comprising a flip-flop 908, an AND circuits 910 and 909, an inverter 907 and an OR circuit 915. Namely, the counter 911 is controlled to perform counting with loading the random number from the random number generator 914 sequentially, once the reception detection signal RX ON turns on, until the off state of the reception detection signal RX ON and the terminated state of counting of the counter 911 are simultaneously satisfied.

While the reception detection signal RX ON is not present and the counter 911 continues counting, the signal the same as the reception detection signal RX ON is generated as the dummy carrier sense signal. The reception detection signal RX ON and the dummy sense signal DCRS are supplied to the OR circuit 917. By the OR output, the carrier sense signal CRS is output. The carrier sense signal CRS is transferred to the LANCE LSI chip as the carrier sense signal thereof. It should be noted that as the LANCE LSI chip, AM7992, DP8390D, NS32490D and so forth can be employed.

Figure 14:
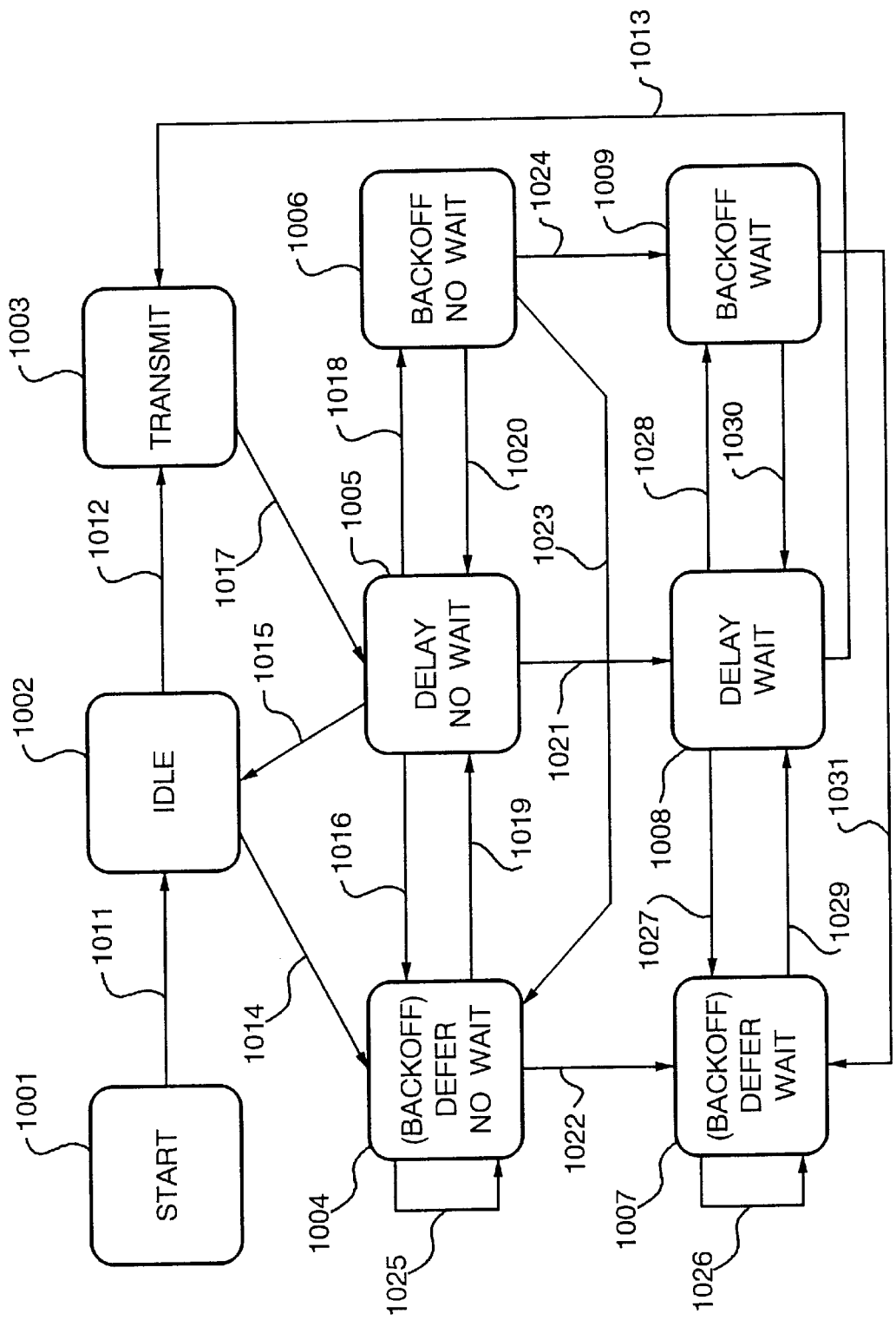
FIG. 14 is an illustration showing a state transition when the fifth embodiment of the protocol conversion system is applied to the CSMA/CD system.

By adding the shown embodiment of the protocol conversion system to the LANCE LSI chip, the state transition of FIG. 23 and the state transition matrix of FIG. 24 of the CSMA/CA system defined by IEEE 802.3 can be converted into the state transition of FIG. 14 and the state transition matrix of FIG. 22.

In the state transition of FIG. 12, the state will never transit to the states 1104, 1109, 1110 and 1111 in the CSMA/CA system. Therefore, these states are removed from the state transition of FIG. 14. On the other hand, the "Backoff No Wait" state 1006 and the "Backoff Wait" state 1009.

When an event 1014 of carrier on is caused from an "Idle" state 1002, the state transition shown in FIG. 12 is performed. On the other hand, when an event 1019 or 1029 of carrier off occurs from the "Idle" state 1002, the state enters into the "Delay NO Wait" state 1005 or "Delay Wait" state 1008, once. At the same time, the timer which becomes time out within a period shorter than or equal to ⅔ of the IFG, becomes operative. Therefore, the state inherently transit to Backoff No Wait" state 1006 or "Backoff Wait" state 1009.

During this period, the backoff timer which is triggered by the event 1014 of carrier on, maintains operation. Then, at "Backoff No Wait" state 1006 or "Backoff Wait" state 1009, when time out is caused on the backoff timer, by the event 1020 or 1030 of time out of the backoff timer, the state transit to "Idle" state 1002 or "Transmit" state 1008" via "Delay No Wait" state 1005 or "Delay Wait" state 1008.

At "Delay No Wait" state 1005 or "Delay Wait" state 1008, handling upon occurrence of the event of time out of the backoff timer depends upon implement. One method is to return the own state by re-triggering the backoff timer. Another method is to ignore the event to generate the event 1018 or 1028 of generation of the dummy carrier sense signal DCRS to cause a delay in the event until transition of the state to "Backoff No Wait" state 1006 or "Backoff Wait" state 1009.

Figure 15:
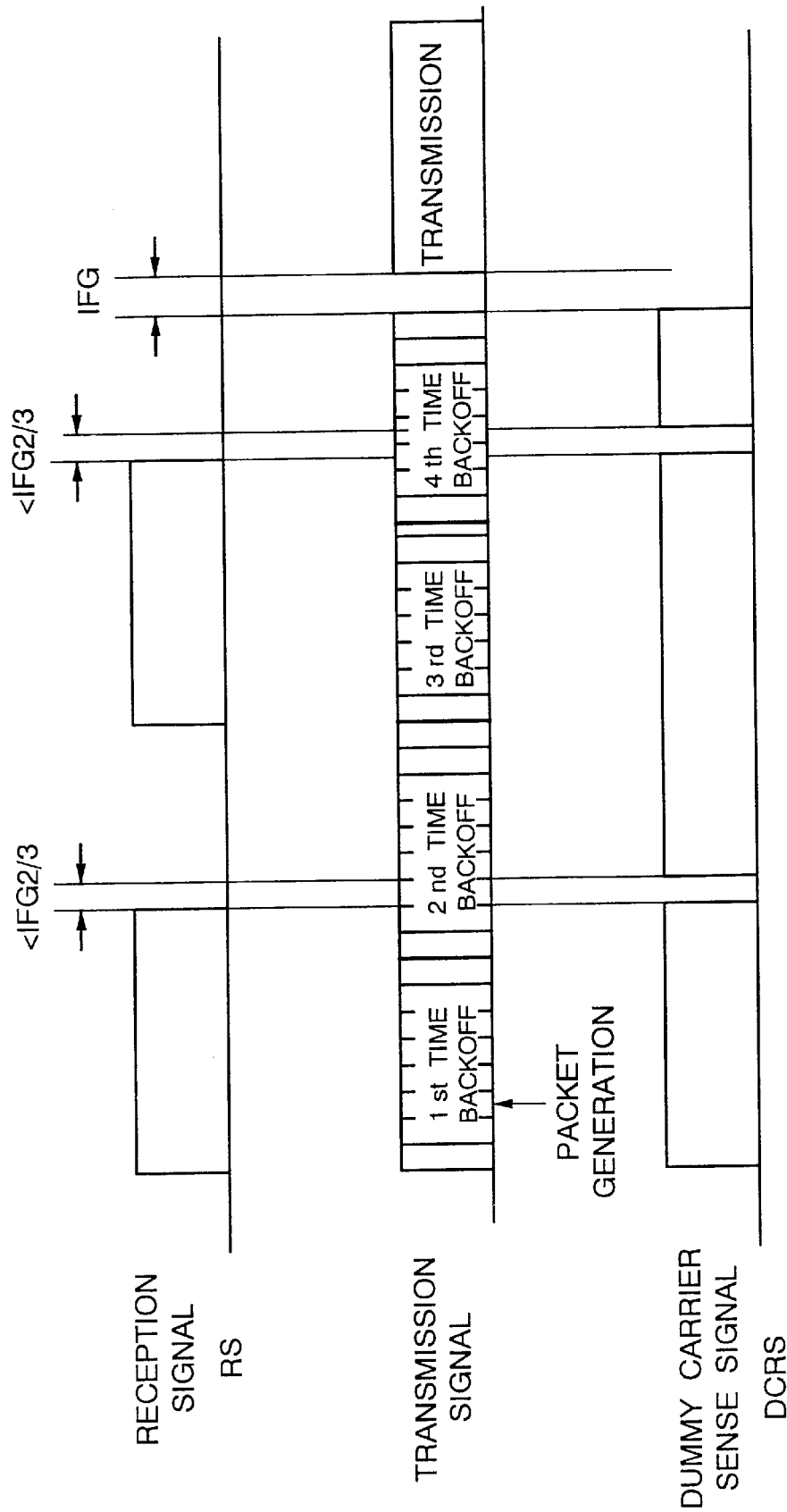
FIG. 15 is a timing chart showing an example of operation of the CSMA/CD system of FIG. 10 in a time axis.

An example of operation on the time axis by the state transition set forth above is illustrated in FIG. 15.

While the signal from the remote station is received, the carrier sense signal CRS is present due to presence of the reception signal RS. The state transit to "Defer Wait" state. Then, the backoff timer becomes active. When reception is terminated, the line becomes vacant for a period shorter than or equal to ⅔ of the IFG and the carrier sense signal CRS once disappears. Subsequently, since the backoff timer is active, the dummy carrier sense signal DCRS appears. In the drawing, since the timer becomes time out before reception of signal from the remote station, transmission of signal is initiated before reception of the signal from the remote station after the IFG period.

The sixth embodiment of the protocol conversion system of the present invention can be realized by replacing the dummy carrier sense signal DCRS in the state transition of FIG. 12 and the state transition matrix of FIG. 21 with generation of the dummy reception signal DRS.

Figure 16:
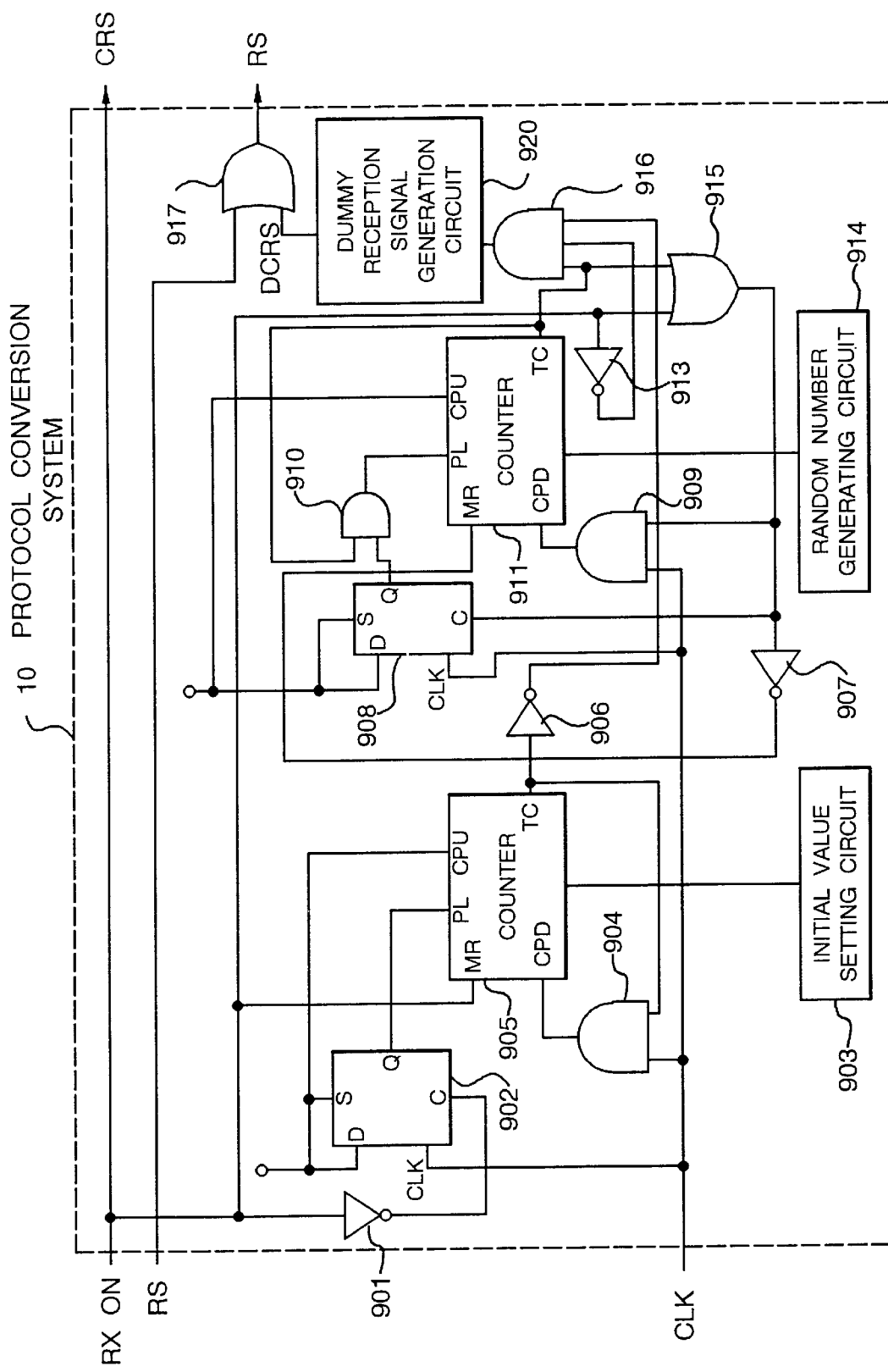
FIG. 16 is a schematic circuit diagram of a circuit for realizing the sixth embodiment of the protocol conversion system according to the invention.

FIG. 16 shows an example of the circuit implementing the sixth embodiment of the protocol conversion system according to the invention.

In the circuit of the sixth embodiment of the protocol conversion system shown in FIG. 16, the reception detection signal RX ON to be the carrier sense signal CRS is directly input to the CSMA/CD communication controller (LANCE LSI chip) as the carrier sense signal CRS to make the shown circuit active. Accordingly, the reception detection signal RX ON is not input to the OR circuit 917.

On the other hand, a dummy reception signal generating circuit 920 for outputting the dummy reception signal DRS in the active state of the AND circuit 916, is provided. When the AND circuit 916 is active, the dummy reception signal generating circuit 920 is operated. The output of the dummy reception signal generating circuit 920 is fed to the OR circuit 917 together with the real reception signal RS for taking OR output. By inputting these signals to the terminal of the LANCE LSI chip defined by the AUI interface, the state transition operation as illustrated in FIGS. 14 and 22 can be realized.

As set forth, according to the present invention, the protocol of the CSMA/CA system can be realized by employing the CSMA/CD system. Therefore, the present invention is quite effective as one example of implementation of the access protocol. As well, switching between the wired communication access, such as LAN and so forth, and the wireless communication access, such as wireless LAN and so forth can be easily realized by adding and removing the protocol conversion system of the present invention to the CSMA/CD system.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A protocol conversion system to be added to a circuit for realizing a protocol in a CSMA/CD system for converting the protocol in the CSMA/CD system into a protocol in a CSMA/CA system, comprising:

first counting means for performing counting for a first period from a timing of termination of a carrier sense signal indicative of input of a reception signal of a data;

random number generating means for generating a random number;

second counting means for performing counting for a period corresponding to a value of said random number generated by said random number generating means after termination of counting by said first counting means;

reset means for forcedly stopping the active one of said first and second counting means at a timing of beginning of said carrier sense signal; and dummy signal generating means for generating a pseudo receive data while said second counting means is active for counting.

2. A protocol conversion system as set forth in claim 1, wherein said first counting means becomes time out within a period shorter than or equal to ⅔ of an inter frame gap.

3. A protocol conversion system as set forth in claim 1, which further comprises means for triggering said first counting means by detecting termination of said carrier sense signal.

4. A protocol conversion system as set forth in claim 1, wherein said dummy signal generating means generates pseudo carrier sense signal and which system includes means for selectively outputs said carrier sense signal and said pseudo carrier sense signal.

5. A protocol conversion system as set forth in claim 1, wherein said dummy signal generating means generates pseudo reception signal and which system includes means for selectively outputting said reception signal and said pseudo reception signal.

6. A protocol conversion system to be added to a circuit for realizing a protocol in a CSMA/CD system for converting the protocol in the CSMA/CD system into a protocol in a CSMA/CA system, comprising:

first counting means for performing counting for a first period from a timing of termination of a carrier sense signal indicative of input of a reception signal of a data;

random number generating means for generating a random number;

second counting means for performing counting for a period corresponding to a value of said random number generated by said random number generating means after termination of counting by said first counting means;

restarting means for restarting said second counting means for counting for a period corresponding to the next random number generated by said random number generating means if said carrier sense signal is detected upon termination of counting of said second counting means;

reset means for forcedly stopping the active one of said first and second counting means at a timing of beginning of said reception signal; and dummy signal generating means for generating a pseudo receive data when said second counting means is active for counting, said first counting means has terminated counting and said reception signal is terminated.

7. A protocol conversion system as set forth in claim 6, wherein said first counting means becomes time out within a period shorter than or equal to ⅔ of an inter frame gap.

8. A protocol conversion system as set forth in claim 6, which further comprises means for triggering said first counting means by detecting termination of said carrier sense signal.

9. A protocol conversion system as set forth in claim 6, wherein said dummy signal generating means generates pseudo carrier sense signal and which system includes means for selectively outputs said carrier sense signal and said pseudo carrier sense signal.

10. A protocol conversion system as set forth in claim 6, wherein said dummy signal generating means generates pseudo reception signal and which system includes means for selectively outputting said reception signal and said pseudo reception signal.

11. A protocol conversion system to be added to a circuit for realizing a protocol in a CSMA/CD system for converting the protocol in the CSMA/CD system into a protocol in a CSMA/CA system, comprising:

first counting means for performing counting for a first period from a timing of termination of a carrier sense signal indicative of input of a reception signal of a data;

random number generating means for generating a random number;

second counting means for performing counting for a period corresponding to a value of said random number generated by said random number generating means after termination of counting by said first counting means;

restarting means for restarting counting of said second counting means with the next random number upon termination of counting of said second counting means and when said carrier sense signal is detected;

reset means for forcedly stopping the active one of said first and second counting means at a timing of beginning of said reception signal; and dummy signal generating means for generating a pseudo receive data when said second counting means is active for counting, said first counting means has terminated counting and said reception signal has also terminated.

12. A protocol conversion system as set forth in claim 11, wherein said first counting means becomes time out within a period shorter than or equal to ⅔ of an inter frame gap.

13. A protocol conversion system as set forth in claim 11, which further comprises means for triggering said first counting means by detecting termination of said carrier sense signal.

14. A protocol conversion system as set forth in claim 11, wherein said dummy signal generating means generates pseudo carrier sense signal and which system includes means for selectively outputs said carrier sense signal and said pseudo carrier sense signal.

15. A protocol conversion system as set forth in claim 11, wherein said dummy signal generating means generates pseudo reception signal and which system includes means for selectively outputting said reception signal and said pseudo reception signal.

* * * * *